(12) United States Patent
Wada et al.

(10) Patent No.: US 6,504,808 B2
(45) Date of Patent: *Jan. 7, 2003

(54) FRONT-LOADING DISK PLAYER WITH SEPARATE FIRST AND SECOND CARRIER UNITS

(75) Inventors: Shigekazu Wada, Tsurugashima (JP); Hiroshi Takemoto, Tsurugashima (JP); Yasumitsu Suzuki, Tokorozawa (JP); Kouichi Yaeguchi, Tokorozawa (JP); Tohru Kanegae, Tokorozawa (JP)

(73) Assignee: Pioneer Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,034

(22) Filed: Oct. 7, 1999

(65) Prior Publication Data

US 2002/0181380 A1 Dec. 5, 2002

(30) Foreign Application Priority Data

Oct. 8, 1998 (JP) ............................. 10-286149
Oct. 8, 1998 (JP) ............................. 10-286150
Oct. 8, 1998 (JP) ............................. 10-286151

(51) Int. Cl.$^7$ ................................. G11B 23/03
(52) U.S. Cl. ................................. 369/75.2; 369/77.1
(58) Field of Search ....................... 369/75.2, 77.2, 369/77.1; 360/94

(56) References Cited

U.S. PATENT DOCUMENTS

| | | | | |
|---|---|---|---|---|
| 5,539,717 A | * | 7/1996 | Choi | 369/77.2 |
| 5,572,498 A | * | 11/1996 | Choi | 369/77.2 |
| 5,615,197 A | * | 3/1997 | Choi | 369/77.2 |
| 5,737,293 A | | 4/1998 | Kawamura et al. | 369/77.1 |
| 5,768,240 A | * | 6/1998 | Hiraga | 369/75.2 |
| 5,812,511 A | * | 9/1998 | Kawamura et al. | 369/77.2 |
| 5,867,338 A | * | 2/1999 | Ohira et al. | 369/75.2 |
| 5,914,929 A | * | 6/1999 | Kato et al. | 369/75.2 |
| 5,933,400 A | * | 8/1999 | Kabasawa | 369/77.2 |
| 5,970,040 A | * | 10/1999 | Bando | 369/178 |
| 5,999,366 A | * | 12/1999 | Shiraishi et al. | 360/99.09 |
| 6,064,640 A | * | 5/2000 | Shinoda et al. | 369/75.2 |
| 6,167,014 A | * | 12/2000 | Kajiyama et al. | 369/75.2 |
| 6,262,960 B1 | * | 7/2001 | Watanabe | 369/77.2 |

FOREIGN PATENT DOCUMENTS

| | | |
|---|---|---|
| EP | 0 661 701 A | 7/1995 |
| EP | 0 855 708 A | 7/1998 |
| EP | 0 883 121 A | 12/1998 |
| WO | WO 98 50918 A | 12/1998 |

* cited by examiner

Primary Examiner—Brian E. Miller
(74) Attorney, Agent, or Firm—Morgan, Lewis & Bockius LLP

(57) ABSTRACT

A front-loading disk player is provided which can pull either a bare disk or a disk mounted in a cartridge into a housing so as to perform an operation of reproducing information thereon. A first carrier unit is moveable from a carrier path of the cartridge disk in association with a carrier of the cartridge disk by a second carrier unit. A cover section has a second slot for only the bare disk therein. The first carrier unit includes a transfer unit for transferring the bare disk, and a holding unit provided on the transfer unit for holding the bare disk on the transfer unit.

21 Claims, 25 Drawing Sheets

FRONT-LOADING DISK PLAYER WITH SEPARATE FIRST AND SECOND CARRIER UNITS

BACKGROUND OF THE INVENTION

1. Technical Field

The present invention relates to a front-loading disk player.

2. Background Art

A CD and a DVD are, as known, used as a bare disk, i.e., the disk is not protected or enclosed. On the other hand, a DVD-R/W, a rewritable DVD, is used in a form in which a disk is mounted in a cartridge provided with a playing window.

Therefore, a front-loading disk player compatible with both a bare disk and a disk mounted on a cartridge is desired.

SUMMARY AND OBJECT OF THE INVENTION

It is an object of the present invention to provide a front-loading disk player which can receive either a bare disk or a disk mounted in a cartridge in a housing so as to play the disk, i.e., to perform an operation of reproducing information therefrom.

A front-loading disk player according to the present invention comprises a front panel having a slot capable of receiving therein both a bare disk and a cartridge disk with a recording disk mounted in the cartridge; a first carrier unit for carrying the bare disk received in the slot; and a second carrier unit for carrying the cartridge disk received in the slot, and the first carrier unit is moveable from a carrier path for the carrier of the cartridge disk by the second carrier unit.

A front-loading disk player according to the present invention comprises a front panel having a slot for receiving therein both a bare disk and a cartridge disk with a recording disk mounted in the cartridge; and a carrier unit for carrying the bare disk received through the slot, and the carrier unit comprises a transfer unit for transferring the bare disk and a holding unit provided on the transfer unit for holding the bare disk on the transfer unit.

DETAILED DESCRIPTION OF THE EMBODIMENT

A description is made hereinafter of a front-loading disk player as an embodiment of the present invention with reference to the attached drawings.

Figure 1:
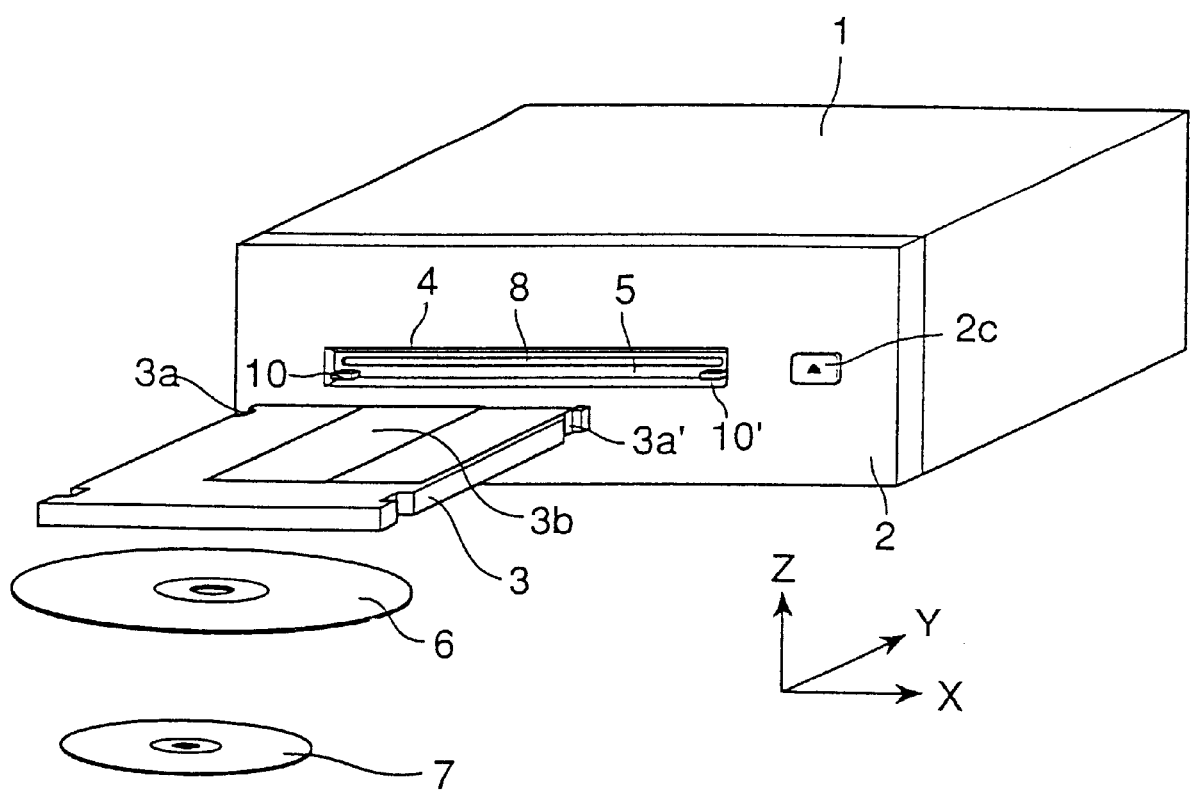
FIG. 1 is a perspective view of the front-loading disk player according to the present invention.
Figure 2:
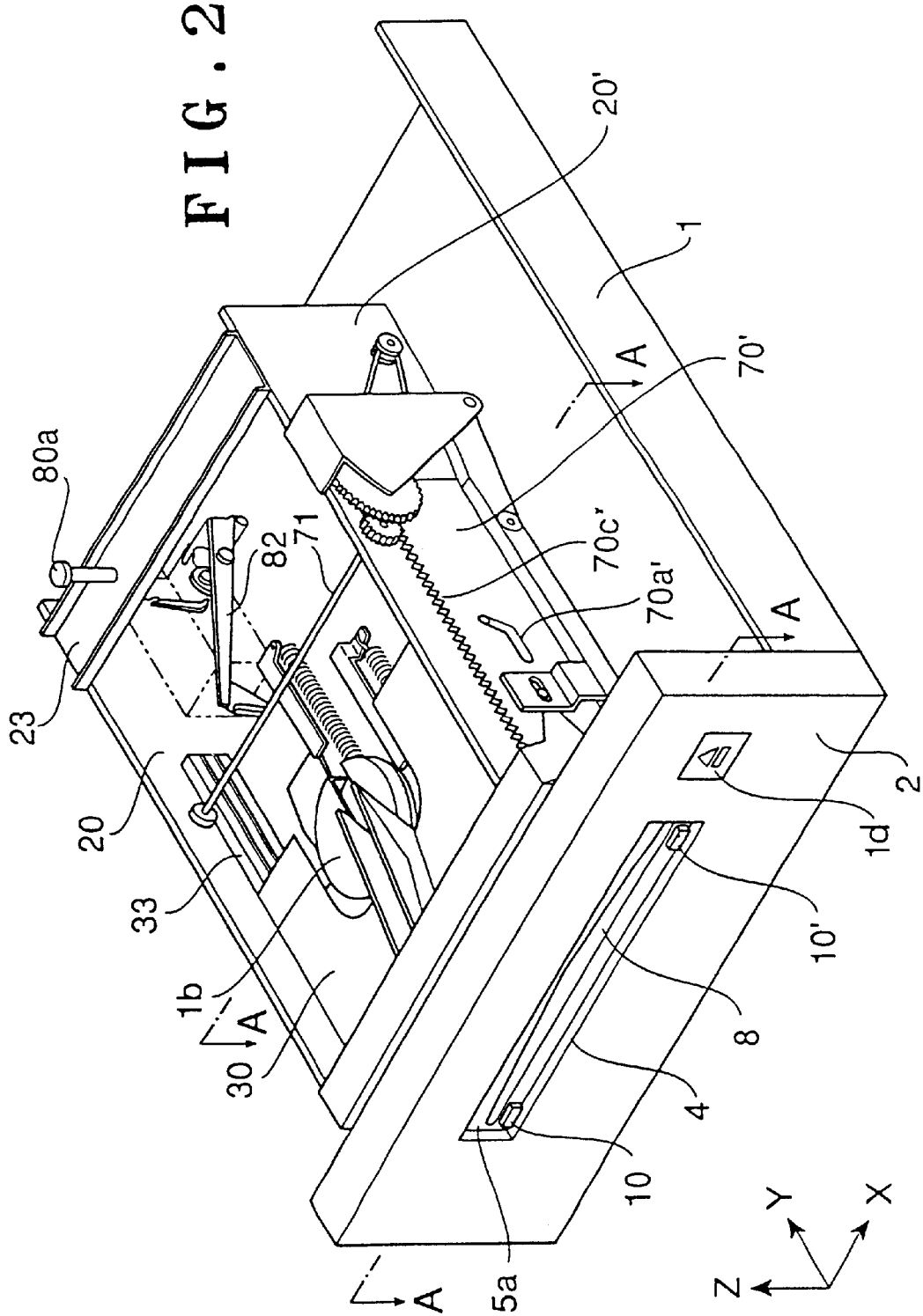
FIG. 2 is a perspective view of the player of FIG. 1 with the housing therefrom.
Figure 3:
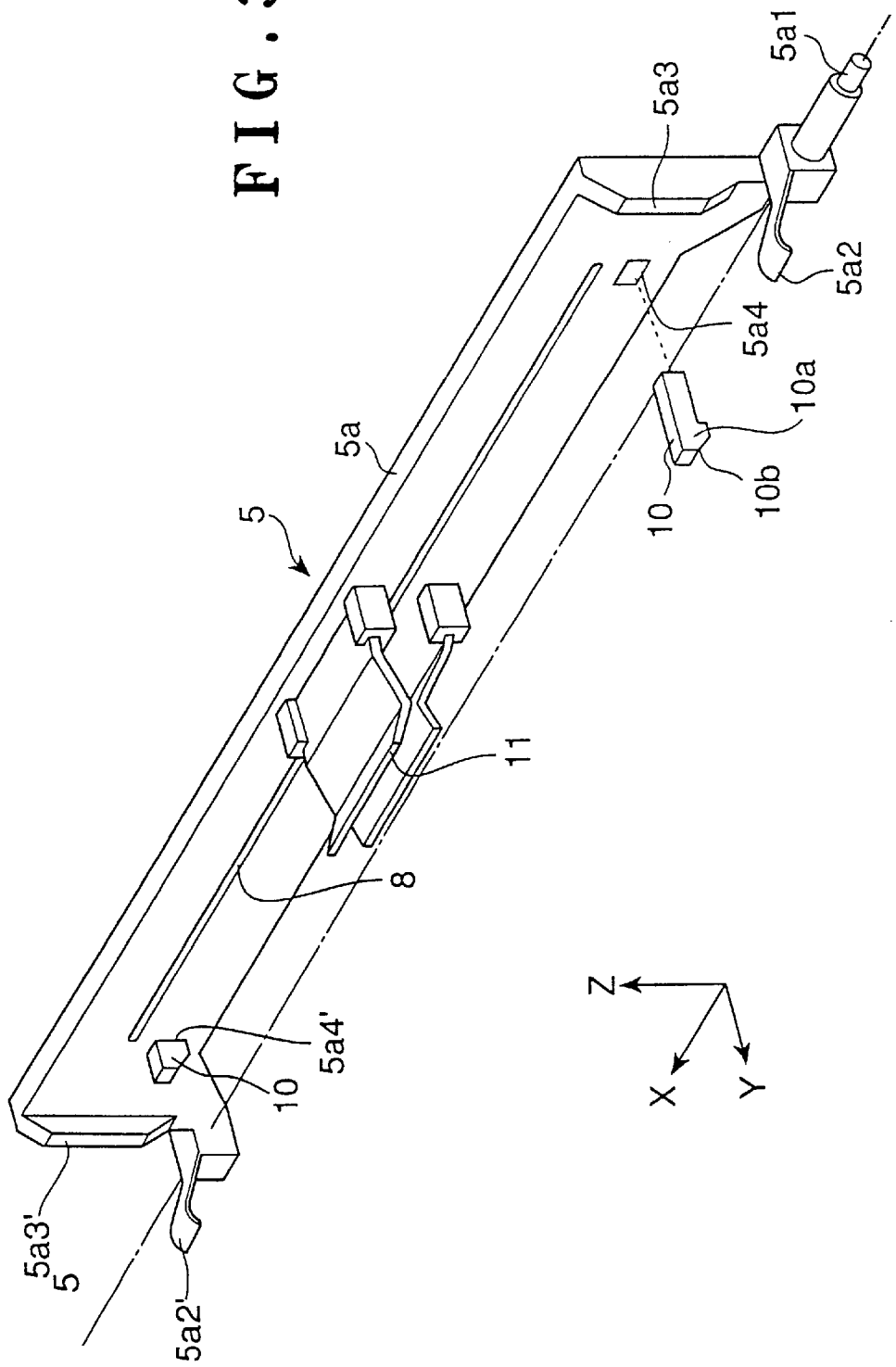
FIG. 3 is a partially-exploded perspective view of the cover provided for the slot on the front panel of the player in FIG. 1.
Figure 4:
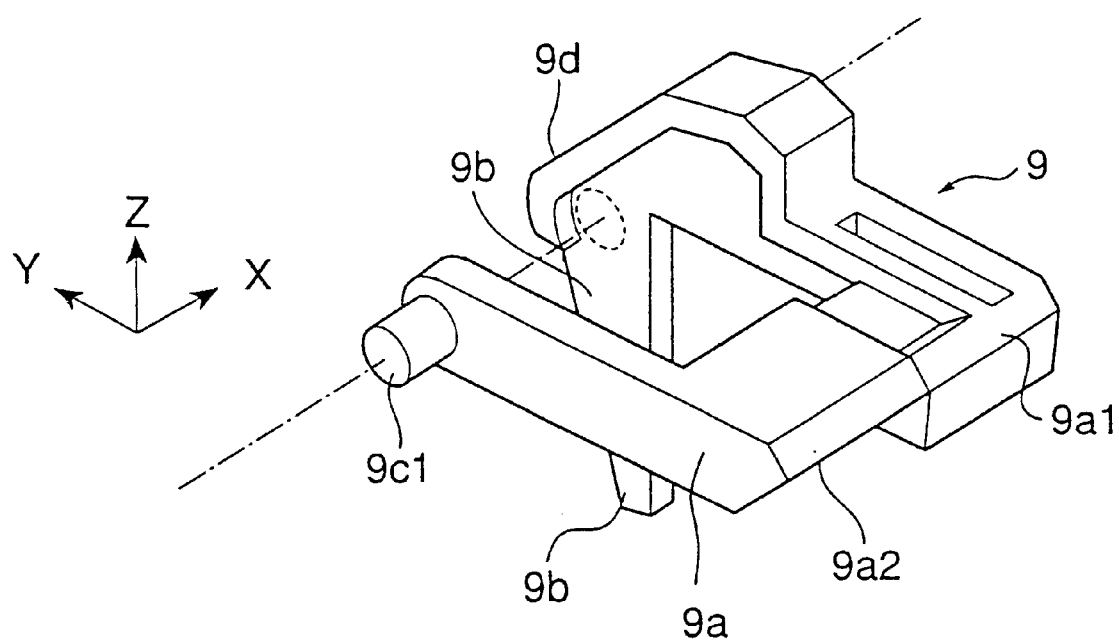
FIG. 4 is a perspective view of a lock arm assembly engaging the cover in FIG. 3.
Figure 5:
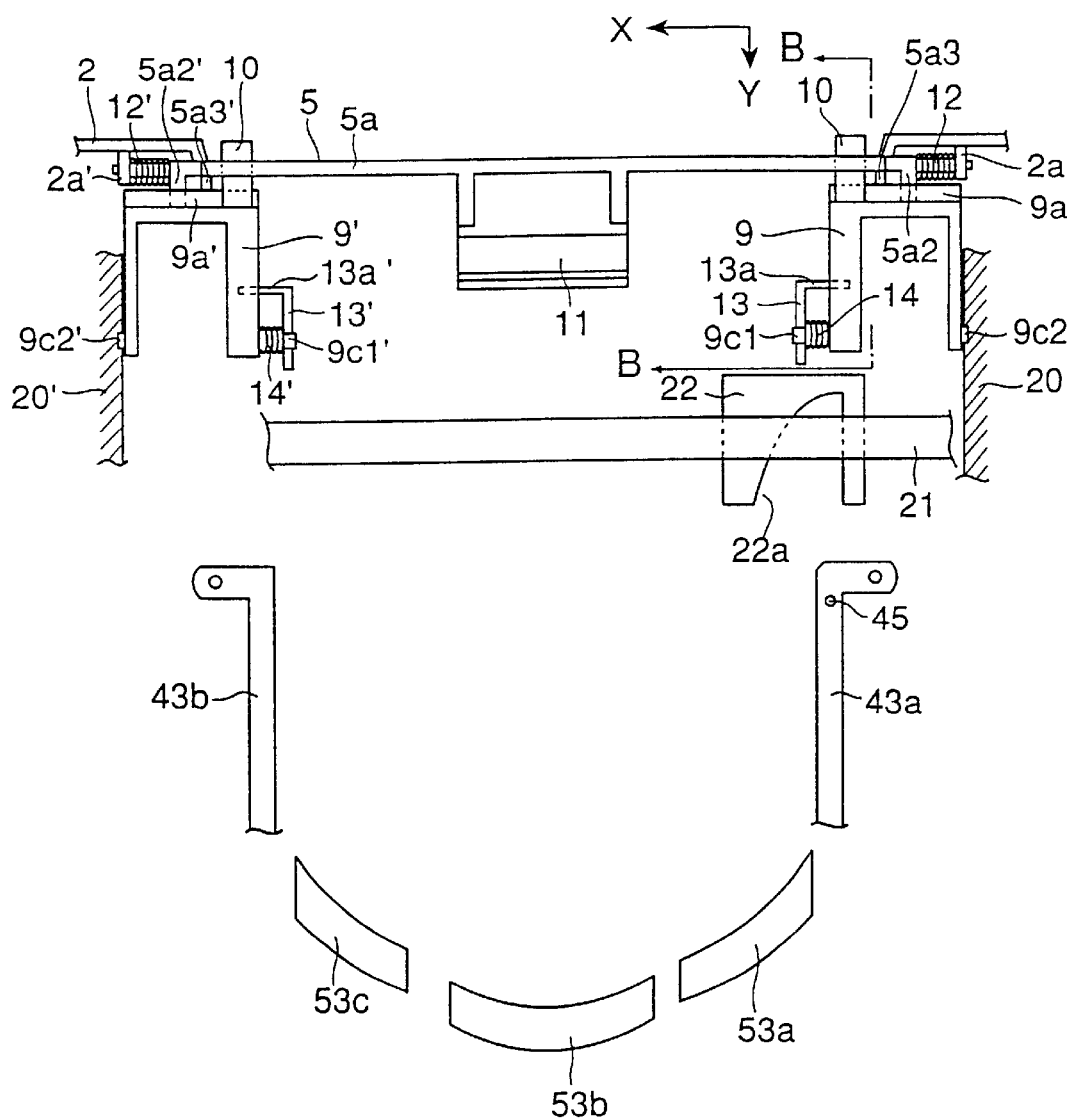
FIG. 5 is a plan view of a key section around the cover along a horizontal surface including the line A—A in FIG. 2.

As shown in FIG. 1, a slot 4 having a width and a height so as to receive therein and eject therefrom a cartridge disk 3 such as a DVD-R/W disk mounted in a cartridge. The slot 4 is provided in a front panel section 2 of a player housing 1 and extends in a side-to-side direction when viewed from the front surface of the player. Herein, the direction shown by an arrow X is a front side, the direction shown by an arrow Y is a rear side, and the direction shown by an arrow Z is an upper side. The cartridge disk 3 has a shutter 3b for exposing a disk therein by opening/closing the shutter from side to side.

A cover 5 is provided adjacent to the slot 4 in the housing 1 and blocks the slot 2 from the interior side of the front panel section 2 so as to open freely. A lock mechanism described later is provided in the cover 5 so that the cover opens only on insertion and ejection of the cartridge disk 3. On the other hand, insertion and ejection of a disk such as a 12 cm-diameter bare disk 6 and an 8 cm-diameter bare disk 7 is executed through a slit 8 provided on the cover 5, thus the cover 5 does not need to be opened for insertion and ejection of an unprotected disk.

As shown in FIG. 2 through FIG. 5, a cover member 5a forming a cover assembly has a pair of rotary shafts 5a1, 5a1' provided in the lower section of both edge sections of the member 5a, and the rotary shafts 5a1, 5a1' are cylindrical projections each extending outward in parallel with the X direction. The cover member 5a is pivotally fixed to a pair of stays 2a, 2a' provided on the rear surface of the front panel section 2 and extending rearward from the section 2 adjacent to the lower section of the slot 4 through the rotary shafts 5a1, 5a1'. Torsion springs 12, 12' are wound around the rotary shafts 5a1, 5a1' and urge the cover member 5a to close on block the slot 4. Accordingly, the peripheral section of the cover member 5a contacts the peripheral section of the opening of the slot 4 to block the slot 4 unless the cover member 5a is pushed from the outside, i.e., the front of the panel. Furthermore, the cover member 5a has a pair of open/close arms 5a2, 5a2' provided adjacent to the rotary shafts 5a1, 5a1' and extending rearward. The open/close arms 5a2, 5a2' are pushed downward in response to the operation described later of ejecting the cartridge. The cover member 5a pivots rearward around an axis defined by the rotary shafts 5a1, 5a1' and the slot 4 opens. Furthermore, both edge sections of the cover member 5a each project rearward to form a pair of open/close stopper surfaces 5a3, 5a3' respectively. A slit 8 extending in a side-to-side direction and through which the bare disks 6 and 7 can be inserted is provided at the center of the cover member 5a. A horizontal-level holding member 11 to keep the disk in a horizontal level and for holding the bare disk 6 or 7 from the upper and lower sides is provided at the center of the rear surface of the cover member 5a, and keeps the disk level while the bare disk is being inserted or ejected. Front insertion sections of unlocking rivets 10 are inserted into through holes 5a4, 5a4' provided adjacent to both edge sections of the cover member 5a from the rear surface thereof respectively, and slightly project from the cover member 5a. The unlocking rivet 10 is a substantially rectangular parallelepiped longitudinal in the front-to-back direction, and a bottom surface 10b of a rear projecting section 10a is a plane inclined toward an intermediate direction between the rear direction, namely the Y direction and Z direction. Each unlocking rivet 10 is biased frontward by a plate spring which is not shown in the figure, and each step section of the rear projecting sections 10a contacts each lower section of the peripheral sections of each opening of the through holes 5a4, 5a4'. With the configuration described above, the unlocking rivets 10 are pushed rearward by external force due to insertion of a disk-mounted cartridge or the like and the cover member 5a is unlocked. This point will be described later in detail.

Figure 6:
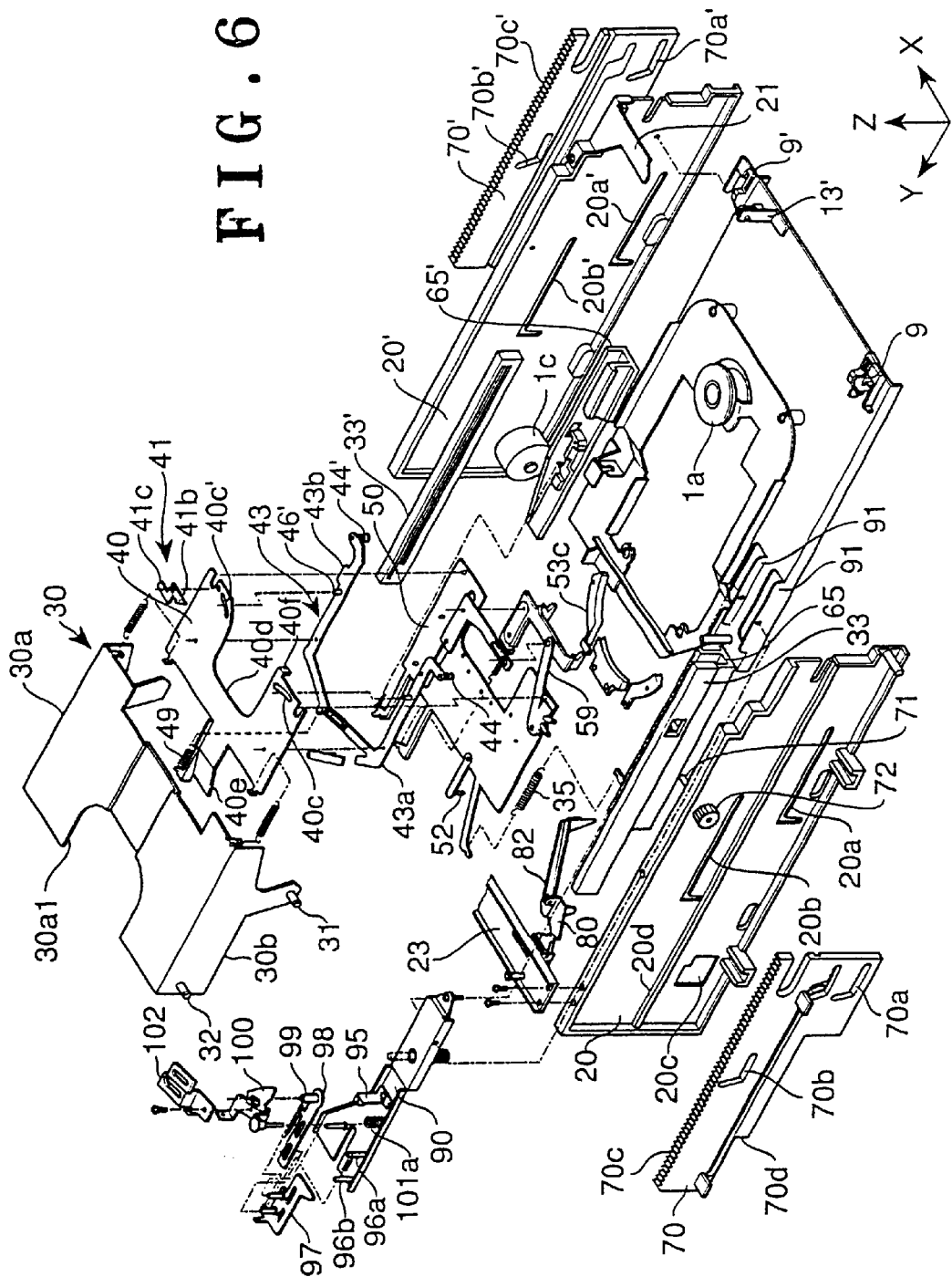
FIG. 6 is an exploded perspective view of a carrier mechanism of the player in FIG. 1.
Figure 7:
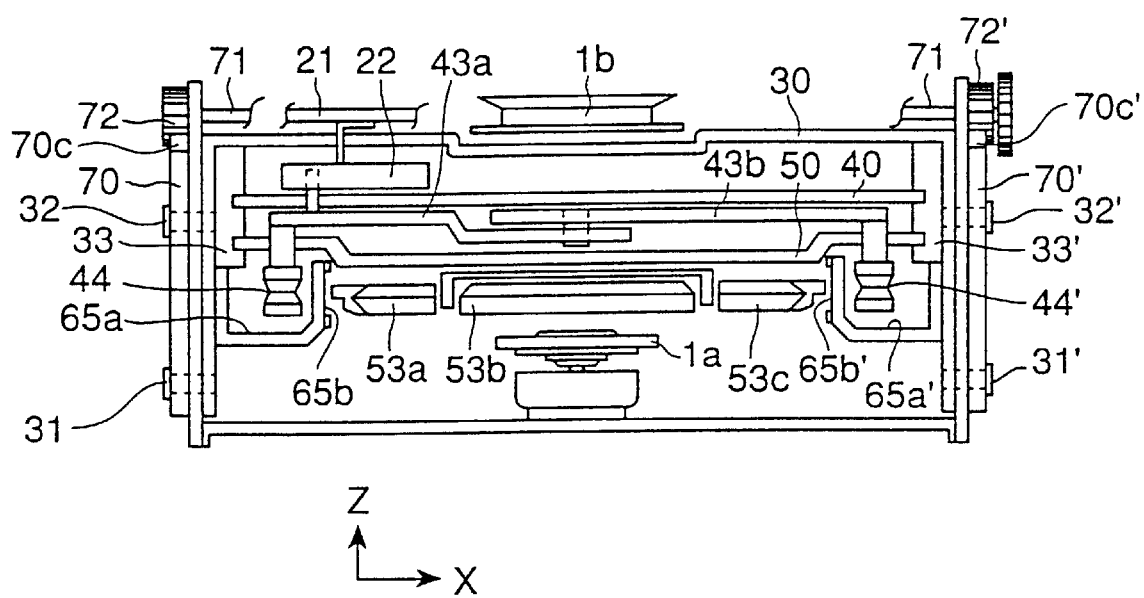
FIG. 7 is a front view of the key section without the front panel in FIG. 2.

A pair of lock arm assemblies 9, 9' are fixed pivotally to the player housing 1 around the pivot in the X-axial direction through stays 13, 13' (Refer to FIG. 6) which are provided in the rear side of the cover 5, fixed to the bottom surface of the player housing 1, and extended upward as well as through fixed chassis 20, 20' described later. The lock arm assembly 9 located in the left side when viewed from the front side comprises a substantially U-shaped lock arm 9a extending frontward, a stopper arm 9b extending from an edge section of one leg of the lock arm 9a downward, and rotary shafts 9c1 and 9c2 each extending outward from the side section in a direction parallel with the X axis. The rotary shafts 9c1 and 9c2 are cylindrical projections extending outward from both side of the lock arm member 9 in a direction parallel with the X axis and each is formed integrally with the lock arm member 9. The rotary shaft 9c1 is wound with a torsion spring 14, and the lock arm 9a gives a bias force to the lock arm assembly 9 in the direction to which the lock arm 9a swings upward, while the stopper arm 9b keeps contact with a stopper section 13a of the stay 13 as far as the cover member 5a blocks the slot 4. Therefore, the lock arm 9a is kept at an extended horizontal position. A portion of a U-shaped bottom section of the lock arm 9a forms an inclined section 9a1 with a downwardly inclined surface extending toward the cover assembly 5 formed as the top surface thereof, and a concave section 9a2 opening downwardly is formed in an area adjacent to the inclined section 9a1. The inclined section 9a1, in a state where the cover member 5a blocks the slot 4, slidably contacts the bottom section 10b of the rear projecting section 10a of the unlocking rivet 10 from the lower side thereof, while the front edge of the lock arm 9a contacts the open/close stopper surface 5a3 of the cover member 5a. The concave section 9a2 contacts the open/close arm 5a2 from the upper side thereof (herein, the top surface of the open/close arms 5a2, 5a2' is preferably a smoothly-curved surface). In addition, the top surface of a linkage section of the lock arm assembly 9 to the stopper arm 9b has a sliding inclined surface 9d which is inclined upwardly from the rear edge section of the assembly 9 over the position exceeding a line linking the rotary shafts 9c1 and 9c2. With this feature, the lock arm 9 rotates downward around the rotary shafts 9c1 and 9c2 as a pivot when the force to push the lock arm assembly 9 frontward while a cartridge (not shown) is sliding along and in contact with the sliding inclined surface 9d is effected on the operation described later of ejecting the cartridge.

Since the lock arm assembly 9' located in the right side when viewed from the front side is a mirror image to the lock arm assembly 9 located in the left side, description thereof is omitted.

As shown in FIG. 6 through FIG. 11, provided in the rear side of the lock arm assemblies 9, 9' is a disk carrier mechanism for carrying a disk supplied through the slot 4 to a playing position. This disk carrier mechanism is fixed to the bottom of the player housing 1 and includes a pair of fixed chassis sections 20, 20' extending in the vertical direction with respect to the bottom and the front panel 2.

The fixed chassis 20 located in the left side when viewed from the front side has reverse-L-shaped cam holes 20a and 20b formed with a space therebetween in the front-to-back direction. The reverse-L-shaped cam holes 20a and 20b are reverse-L-shaped through holes having the same form as each other and each having a horizontal section horizontally extending rearward in the Y direction and a vertical section which is continuously formed to the horizontal section and extends downward at right angles thereto. The fixed chassis 20' located in the right side has the same form as the fixed chassis 20 in the left side and has reverse-L-shaped cam holes 20a' and 20b' formed with a space therebetween in the front-to-back direction. A stiffening rib 20d is provided along the center section of the chassis 20.

A carrier member 30 is formed by bending a metal sheet and has a substantially U-shaped cross section opening downward. A top section 30a provided over the fixed chassis 20, 20' has a cutout section 30a1 opening rearward. Each of a pair of pins 31, 32, and 31', 32' projecting outward and parallel with the X axis are positioned with a space between each of the pair in the front-to-back direction as well as in the vertical direction in a pair of right and left downward-bent sections 30b and 30b' provided inside of the fixed chassis section 20, 20' and extending in parallel with the chassis section.

A pair of rack members 70, 70' are located outside of the fixed chassis sections 20, 20' and extend in parallel with the fixed chassis sections 20, 20' respectively. The rack member 70 located in the left side when viewed from the front side has inclined cam holes 70a and 70b formed with a space therebetween in the front-to-back direction. The inclined cam holes 70a and 70b are through holes each forming a horizontal section horizontally extending rearward in the Y direction and an inclined section which is continuously formed to the horizontal section and extends rearward with inclination thereof upward. The rack member 70' located in the right side has the same form as the rack member 70 and has inclined cam holes 70a' and 70b' formed with a space therebetween in the front-to-back direction. Rack gears 70c, 70c' are formed on the top of the rack member 70, 70' respectively. A shaft 71 extends in the direction of both sides to be pivotally supported by the fixed chassis sections 20, 20', and pinion gears 72, 72' are fixed to both edge sections of the shaft 71 respectively. The pinion gears 72, 72' engage the rack gears 70c, 70c' respectively, and a driving unit is connected to the pinion gear 72' through a power transmission unit like a belt (not shown) from a motor 1c. With this configuration, when the motor 1c is actuated to rotate the pinion gear 72', the rack members 70, 70' reciprocate in synchronism with the pinion gear.

The carrier pins 31, 32, 31', 32' positioned in the right and left downward-bent sections 30b, 30b' of the carrier member 30 project and extend outward through the reverse-L-shaped cam holes 20a, 20b, 20a', 20b' of the fixed chassis sections 20, 20', and slidably engage the inclined cam holes 70a, 70b, 70a', 70b' of the rack members 70, 70' respectively. In the initial state, the carrier pins 31, 32, 31', 32' are positioned slightly backward from each front edge section of the reverse-L-shaped cam holes 20a, 20b, 20a', 20b' of the fixed chassis sections 20, 20' as well as positioned at each rear edge section of the inclined cam holes 70a, 70b, 70a', 70b' of the rack members 70, 70' respectively.

A disk supporting mechanism for supporting a disk to be carried is provided inside the carrier member 30. The disk supporting mechanism includes a pair of plate guides 33, 33', and the plate guides 33, 33' are each a rectangular parallelepiped block extending in the Y direction and are fixed to the inner sides of the right and left downward-bent sections 30b, 30b' of the carrier member 30. The plate guide 33' in the right side has a first slit 33a' and a second slit 33b' provided on a side face opposite to the surface in contact with the carrier member 30 with a space therebetween in the vertical direction extending parallel to the Y direction. The first slit 33a' and second slit 33b' are grooves each of which has an opening inside thereof and which start at positions 33a1', 33b1' slightly backward from the front edge section of the plate guide 33' as each starting point thereof respectively (Refer to FIG. 9). The plate guide 33 in the left side has the same configuration as described above.

Figure 8:
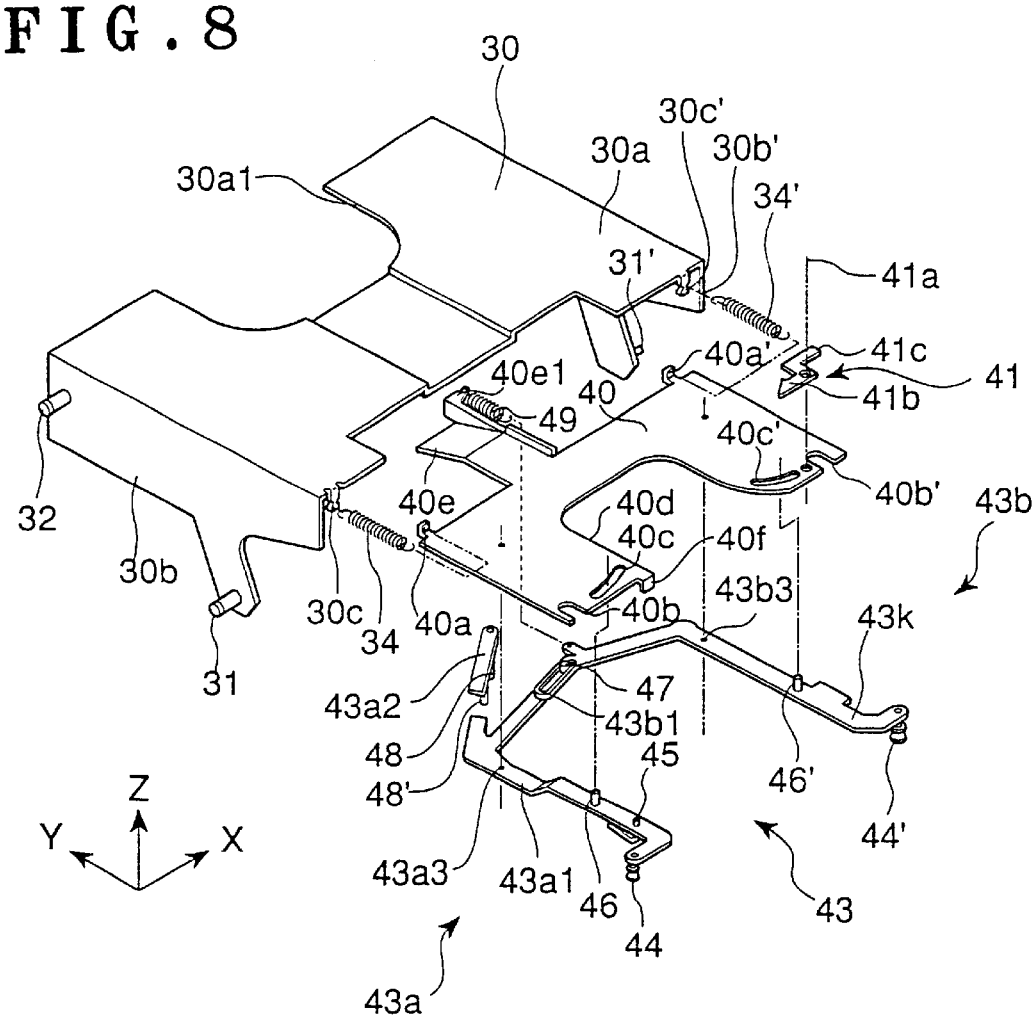
FIG. 8 is a partially-exploded perspective view of the area around a hold assembly of the carrier mechanism in FIG. 6.

As shown in the details in FIG. 8, a flat arm plate 40 extends across the pair of first slits 33a, 33a' provided in the plate guides 33, 33' and engages the slits so that the plate can slide to and fro. Projections 40a, 40a' projecting at both edge sections in the rear side of the arm plate 40 are connected to projections 30c, 30c' projecting from both edge sections in the front side of the carrier member 30 with springs 34, 34' respectively, so that the arm plate 40 is urged frontward. Accordingly, the front edges of the arm plate 40 contact the front edges 33a1 and 33a1' of the first slits 33a, 33a' in the plate guides 33, 33' respectively. Notches 40b, 40b' extending rearward are formed at positions adjacent to both of the edge sections in the front side of the arm plate 40. Furthermore, arc-shaped holes 40c, 40c' each forming a part of an arc are formed in the direction of a center line with each starting point of the holes at an internal side from the notches 40b, 40b'. Furthermore, a lock plate 41 is pivotally supported by the arm plate 40 around a pivot 41a positioned between the notch 40b' and the starting point of the arc-shaped hole 40c', and the lock plate is biased for rotation in the clockwise direction when viewed from the upper side by a bias unit and a stopper unit (not shown) therein, and is extended in the direction of both sides thereof. A hook-shaped edge 41b in the left side of the lock plate 41 is located on the arc-shaped hole 40c', and one edge 41c thereof in the right side is located on the notch 40b'. A switch (not shown) for detecting release of engagement with a hold arm 43b described later is engaged with the lock plate 41. Furthermore, the arm plate 40 has a cutout section 40d opening frontward between the arc-shaped holes 40c, 40c'. There is a tongue section 40f extending downward near the cutout section 40d.

A hold arm assembly 43 includes substantially-L-shaped first arm member 43a and second arm member 43b each extends rearward and is continuously bent to the inner side thereof. The first and second arm members 43a, 43b are connected to each other at the rear edges thereof. The first arm member 43a comprises a main arm section 43a1 extending rearward and continuously bent to the right side, and a branched arm section 43a2 which is branched at a bent section and extends slightly more toward the rear side than the main arm section 43a1. The main arm section 43a1 has a step inclined frontward and upward, and a disk guide tip 44 extending downward is pivotally fixed to the bottom surface of an edge section in the front side thereof. An arm reset pin 45 and guide pin 46 are provided to extend upwardly between the front edge section and the bent section of the main arm section 43a1. The pin 45 is held and biased upwardly by a plate spring. A linkage pin 47 is provided to upward at the rear edge section of the main arm section 43a1. Load pin 48, 48' are positioned to extend downward at the rear edge section of the branched arm section 43a2 as well as at the front side therefrom. The first arm member 43a is rotatably attached to the bottom surface of the arm plate 40 around a pivot 43a3 near the bent section. A disk guide tip 44' extending downward is rotatably attached to the bottom surface of an edge section in the front side of the second arm member 43b so that the guide tip is rotatably fixed thereto. The second arm member 43b has a guide pin 46 which is positioned to extend upward at a midpoint between the front edge section and the bent section thereof. In addition, the second arm member 43b has an elongated slot or hole 43b1 at the rear edge section thereof to slidably engaged with the linkage pin 47 of the first arm member 43a. A spring 49 is provided across a projection 43b2 adjacent to the rear edge section of the second arm member 43b and a projection 40e1 of a tongue section 40e having a slope extending slightly downward toward the rear side from the arm plate 40. The second arm member 43b is rotatably attached to the bottom surface of the arm plate 40 around a pivot 43b3 near the bent section. The two guide pins 46, 46' of the first and second arm members 43a, 43b are slidably engaged with the arc-shaped holes 40c, 40c' of the arm plate 40 respectively. Furthermore, the guide pin 46' projects from the top surface of the arm plate 40 through the arc-shaped hole 40c' to be engaged with the hook-shaped edge 41b of the lock plate 41. With the configuration described above, the first and second arm members 43a, 43b pivot concurrently and in the opposite direction to each other at the rotation axes 43a3, 43b3 each as a fulcrum to move the disk guide tips 44, 44' at the front edge sections in the direction of both sides so as to close or separate the guide tips to and from each other, so that the disk 6 or 7 can be held or released from the sides thereof. In addition, an arm reset plate 22 having a groove 22a to guide the arm reset pin 45 of the hold arm assembly 43 is fixed to the bottom surface of a front bridge plate 21 formed across the front edge sections of the fixed chassis sections 20, 20'.

Figure 9:
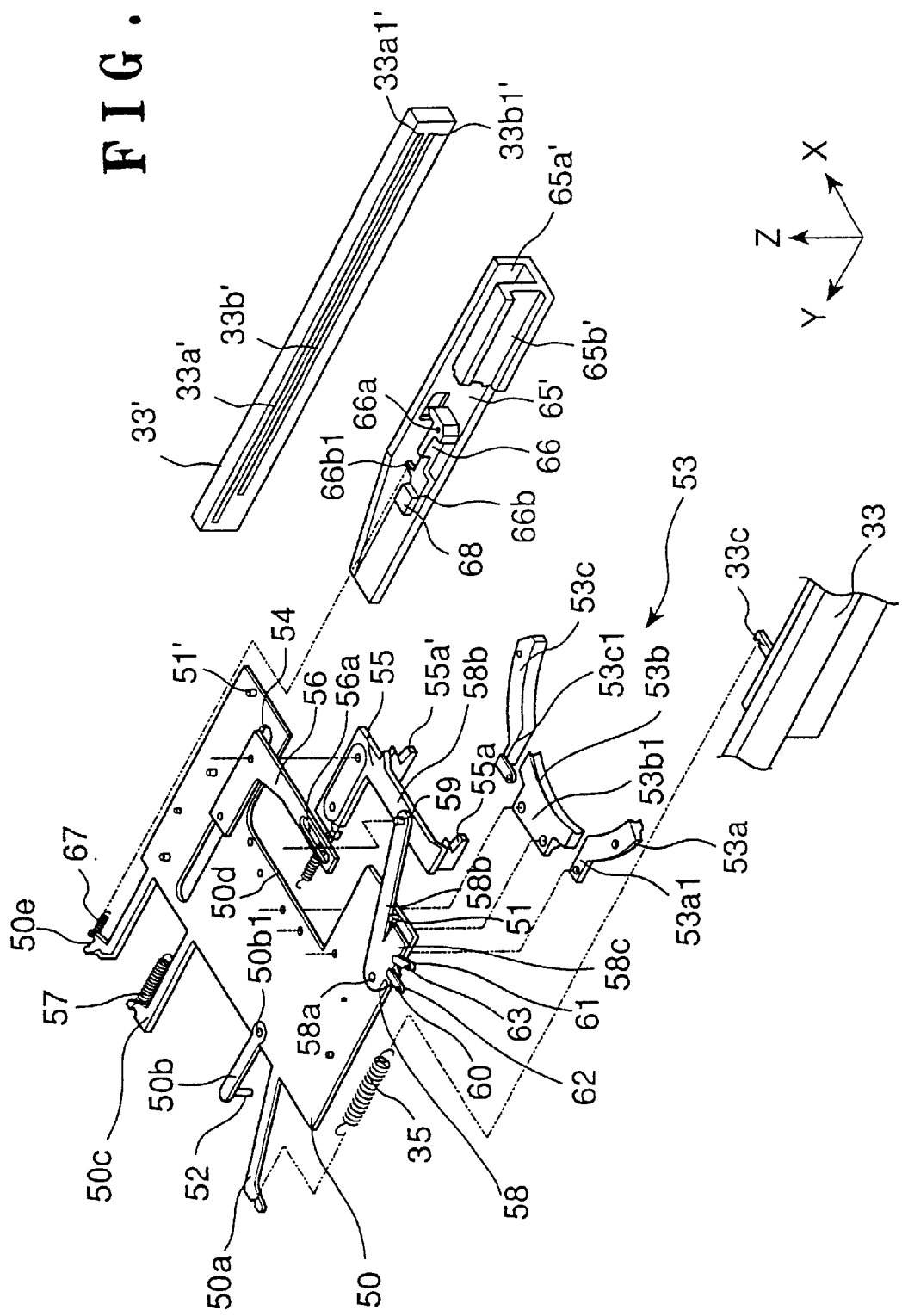
FIG. 9 is a partially-exploded perspective view of the area around a centering plate of the carrier mechanism in FIG. 6.

As shown in detail in FIG. 9, a flat centering plate 50 extends across the pair of second slits 33b, 33b' provided in the plate guides 33, 33' and can slide to and fro with respect to the slits. An arm 50a extending rearward is provided in the left rear side of the centering plate 50, and a spring 35 is provided across a projection at the edge thereof and a projection 33c is provided in the plate guide 33. Therefore the centering plate 50 is urged frontward to contact the front edges 33b1 and 33b1' of the second slits 33b, 33b'. The centering plate 50 has stopper pins 51, 51' positioned to extend upward at both edge sections in the front side thereof. A centering load arm 50b extending rearward is rotatably supported by the centering plate in the left rear side thereof, and a centering load pin 52 is positioned to extend downward at the edge thereof. The arm 50b is biased clockwise around a pivot 50b1 as viewed from the upper side, and a stopper (not shown) contacts the rear edge of the centering plate 50, so that the arm 50b is maintained such that the arm is directed rearward. Furthermore, a guide ring 53 formed with three members is fixed to the bottom surface of the centering plate 50.

An elongated slot 54 extending in the Y direction is provided in the right side of the centering plate 50. A disk push plate 55 and a pull arm guide plate 56 made to a set by a rivet (not shown) passing through the slot 54 hold the centering plate 50 from the lower side and the upper side to be linked to each other, and the plates 55 and 56 are slidable with respect to the centering plate 50 in the front-to-back direction, in the Y direction.

As described above, the stopper pins 51, 51' project upwardly at both edge sections in the front side of the centering plate 50, and can be freely engaged in the notches 40b, 40b' of the arm plate 40. Therefore, the arm plate 40 is moved rearward in association with movement of the centering plate 50. Furthermore, the stopper pin 51' rearward extends through the arm plate 40 passing through the notch 40b', and contacts the edge 41c of the lock plate 41 pivotally attached to the arm plate 40 above the notch 40b' from the front side.

The guide ring 53 is formed with three members, in which each of large-diameter guide rings 53a and 53c is an arc-shaped body having a curved groove contacting the edge of the disk 6 having a diameter of 12 cm, and a small-diameter guide ring 53b is an arc-shaped body having a curved groove contacting the edge of the disk 7 having a diameter of 8 cm. The guide rings are spaced and fixed to the bottom surface of the centering plate 50 in the order of the large-diameter guide ring 53a, small-diameter guide ring 53b, and large-diameter guide ring 53c from the left side. The guide rings 53a, 53b, 53c have tongue-shaped sections 53a1, 53b1, 53c1 each projecting rearward, and a spacer (not shown) for making a space is provided between the tongue-shaped sections 53a1, 53b1, 53c1 and the centering plate 50, and the sections are fixed to the centering plate 50 with a space therebetween. The set of the disk push plate 55 and the pull arm guide plate 56 is slidably engaged in the slot 54 of the centering plate 50, and a pair of disk guide flanges 55a, 55a' extending downwardly is fixed to the bottom surface of the disk push plate 55. A spring 57 is provided across a projection 55b in the rear side of the disk push plate 55 and a projection 50c is in the rear side of the centering plate 50. Accordingly, the disk push plate 55 is accommodated in a space between the above mentioned centering plate 50 and guide ring 53b. The pair of disk guide flanges 55a, 55a' are positioned in spaces between the guide rings 53a and 53b and between the guide rings 53b and 53c respectively. The pull arm guide plate 56 has an arm section provided by bending the front edge section of the plate to the left side, and a slot 56a is formed on the arm section.

A substantially L-shaped pull arm plate 58 formed with two long and short arms is supported at a bending section 58a of the plate by the centering plate 50 on the left side thereof, and a pin 59 is positioned to extend upward at the edge section of the long arm 58b extending to the right side so as to be slidably engaged in the slot 56a of the pull arm guide plate 56. A cam lock plate spring 60 for a large-diameter disk and a cam lock plate spring 61 for a small-diameter disk each extend to the left side with a spaced therebetween and are fixed to the short arm 58c of the pull arm plate 58. Dome-shaped projections 62 and 63 are provided and extend upward on each tip section of the cam lock plates 60, 61 respectively. The centering plate 50 has an cutout section 50d opening frontward.

A pair of cartridge guide members 65, 65' each have a channel shape opening toward the upper side of a substantially U-shaped cross section thereof, and are fixed to each inner side of the downward-bent sections 30b, 30b' of the carrier member 30 as well as to each lower section of the plate guides 33, 33' so as to extend in parallel with each other. Escape grooves 65a, 65a' opening toward the upper side of the cartridge guide members 65, 65' are grooves used for the disk guide tips 44, 44' of the hold arm assembly 43 and passing therethrough moving rearward together with the arm plate 50 when the arm plate 50 moves rearward. The escape grooves 65a, 65a' preferably exist in inner sides more than the inner plane of the plate guides 33, 33'. Furthermore, a pair of cartridge guide grooves 65b, 65b' each for guiding a cartridge disk 3 are formed in each inner side of the cartridge guide members 65, 65'. The cartridge guide grooves 65b, 65b' are shorter in length in the Y direction than that of the cartridge guide members 65, 65', and a cartridge lock 66 for being engaged in the concave section 3a' (Refer to FIG. 1) of the cartridge disk 3 loaded along the cartridge guide groove 65b' to lock the cartridge disk 3 is provided further in the rear side than the rear edge of the cartridge guide groove 65b'.

The cartridge lock 66 is provided on the upper surface of the bottom section of the cartridge guide member 65 and pivotally supported by the bottom section around a pivot 66a. A spring 67 is provided across a projection 66b1 at an edge section 66b of the cartridge lock 66 and a projection 50e in the rear side of the centering plate 50, and when the centering plate 50 is moved rearward in response to insertion of a cartridge disk 3, the edge section 66b of the cartridge lock 66 projects to the inner side of the cartridge guide groove 65b' because of tension of the spring 67 to securely hold the cartridge disk 3. Furthermore, a switch 68 for detecting that the cartridge disk 3 has held the cartridge disk 3 is engaged with the cartridge lock 66.

Figure 10:
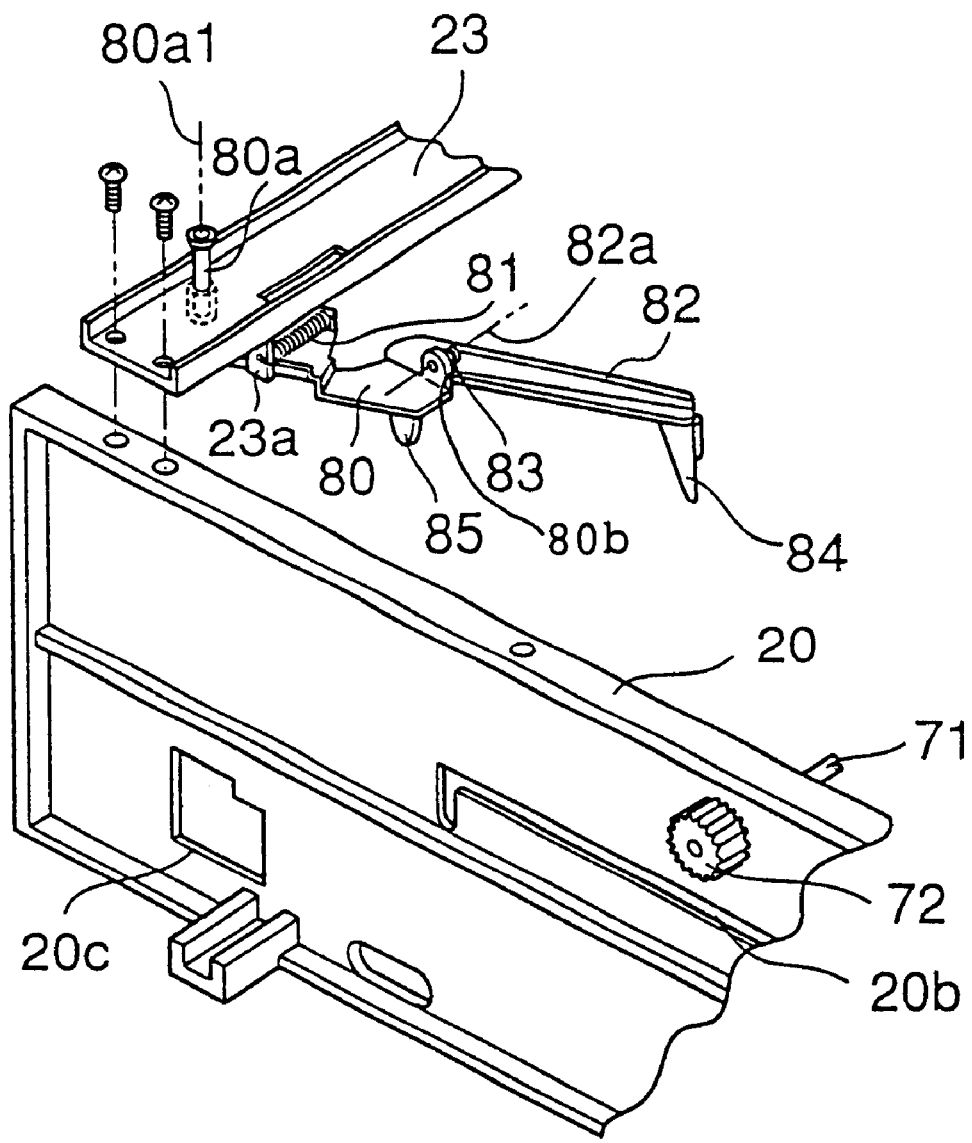
FIG. 10 is a partially-exploded perspective view of the area around a shutter-open/close arm of the carrier mechanism in FIG. 6.

As shown in the details in FIG. 10, a shutter release mechanism for releasing the shutter 3b of a cartridge to permit a disk inside to be played is provided on a longitudinal rear bridge plate 23 formed across the rear edge sections of the fixed chassis sections 20, 20'. An arm supporting member 80 is rotatably attached to the bottom surface of the rear bridge plate 23 around a pivot 80a1 of a pair 80a of a pin and a boss as well as slidably in the axial direction. A spring 81 is provided across a projection on the arm supporting member 80 extending upward from a front section adjacent to the pivot 80a1 and a projection 23a extending downward from the plate 23. The edge of the projection 23a contacts the side of the arm supporting member 80, and the arm supporting member 80 is kept at a position such that the member should be biased in a frontward clockwise direction as viewed from the upper side. The shutter open/close arm 82 is swingably supported by the front section of the arm supporting member 80 around a pivot 82a adjacent to the rear edge section of the shutter open/close arm 82 as far as a stay 80b extending upward. A torsion spring 83 is provided around the pivot 82a to provide rotational bias thereto and pivot the front edge of the shutter open/close arm 82 upward, and further the shutter open/close arm 82 is kept at a position such that the arm 82 should be directed frontward by a stopper (not shown). An open/close lever 84 is engaged with the shutter 3b of the cartridge disk 3 to open the cartridge and is fixed to the front edge section of the shutter open/close arm 82 so that the lever extends downward, and an up-and-down lever 85 is fixed to the rear edge section thereof so that the lever extends downward.

Figure 11:
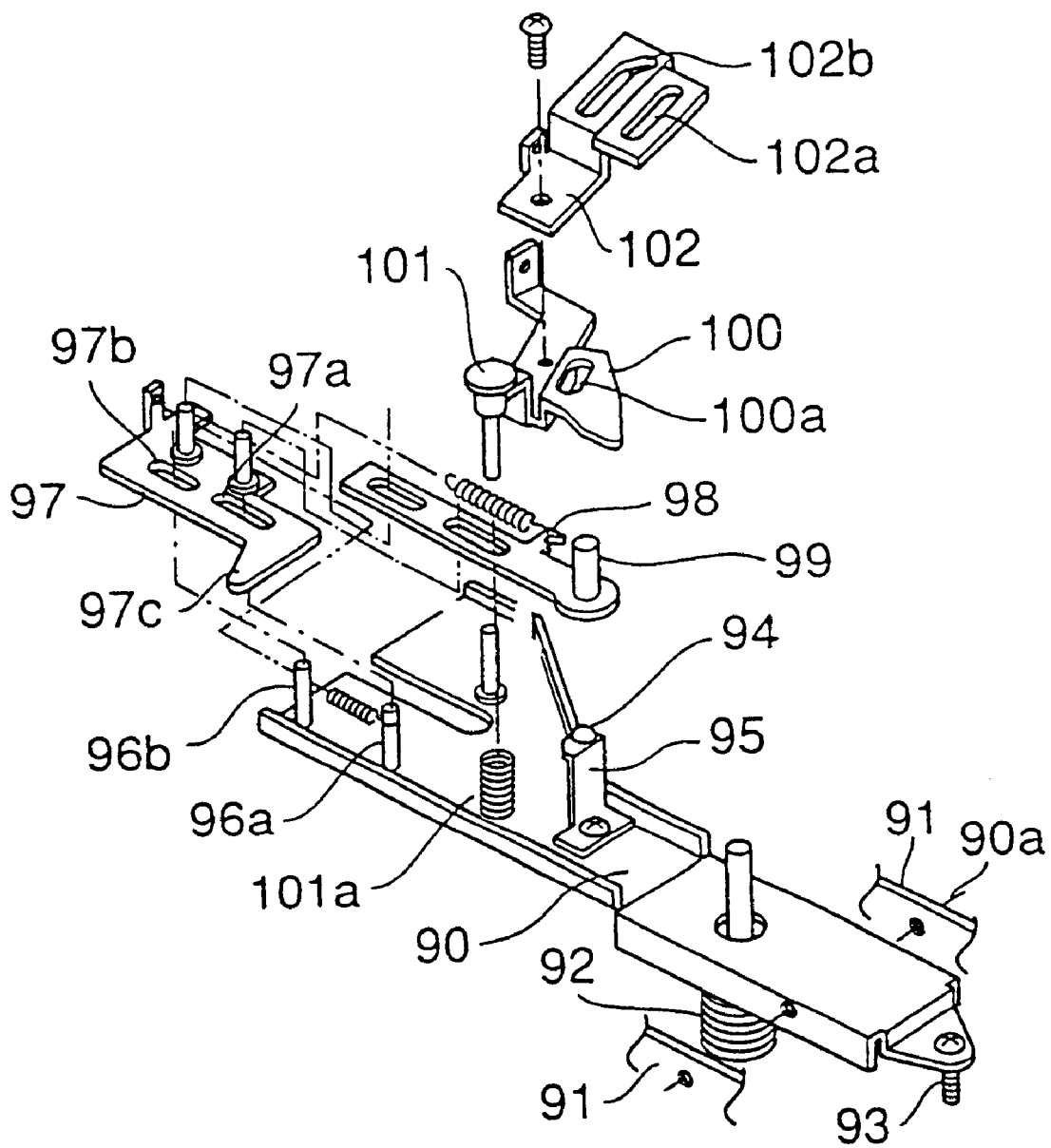
FIG. 11 is a partially-exploded perspective view of the area around an escape plate of the carrier mechanism in FIG. 6.

As shown in the details in FIG. 11, a disk positioning mechanism is provided on the bottom surface of the player housing 1 in the left rear side of the player housing 1 of data. The mechanism positions a disk to a playing unit 1a for recording and reproduction. An escape or moving plate 90 is rotatably supported around a pivot 90a by a stay 91 extending upward from the bottom surface of the player housing 1. In the rear side from this pivot 90a, a spring 92 is provided between the escape plate 90 and the bottom surface of the player housing 1 to bias the escape plate 90 upward, while a stopper pin 93 is provided to extend downward at the front edge of the escape plate 90 and contacts the player housing 1. Therefore, the escape or moving plate 90 extends in parallel with the bottom surface of the player housing 1. Furthermore an escape guide 94 for moving the escape plate 90 downward is fixed to the escape plate 90 through a release bracket 95. Guide pins 96a, 96b are spaced from each other and positioned to extend upward, and are slidably engaged to reciprocate in two slots 97a, 97b formed in a drive plate 97 with a space therebetween. A lever 97c extending to the side is formed in the edge section of the drive plate 97, and the lever 97c extends outward through a window section 20c of the fixed chassis section 20 and can be contacted with an edge 70d of the rack member 70. A load plate 98 slidably supported on the drive plate 97 and biased by a spring has a pin 99 extending upward at the front edge section thereof. A load arm member 100 is vertically-elastically linked to the escape or moveable plate 90 through a spring 101a and further rotatably liked to a pin 101 around the axis thereof. The pin 99 is slidably engaged in a slot 100a of the load arm member 100. A pull plate 102 is fixed to a position apart from the pin 101 as a pivot of the load arm member 100. The pull plate 102 has a slot 102a extending in both sides provided in the front side and a slot 102b in the rear side thereof. With the configuration described above, when the lever 97c is moved rearward, the pull plate 102 pivots rearward around the pin 101 as a pivot. This movement will be described later in detail.

Next a description is provided for operations of the front-loading disk player configured as described above. At first, there will be specifically described loading of a disk when the disk to be played is a 12 cm-diameter bare disk 6.

Figure 12:
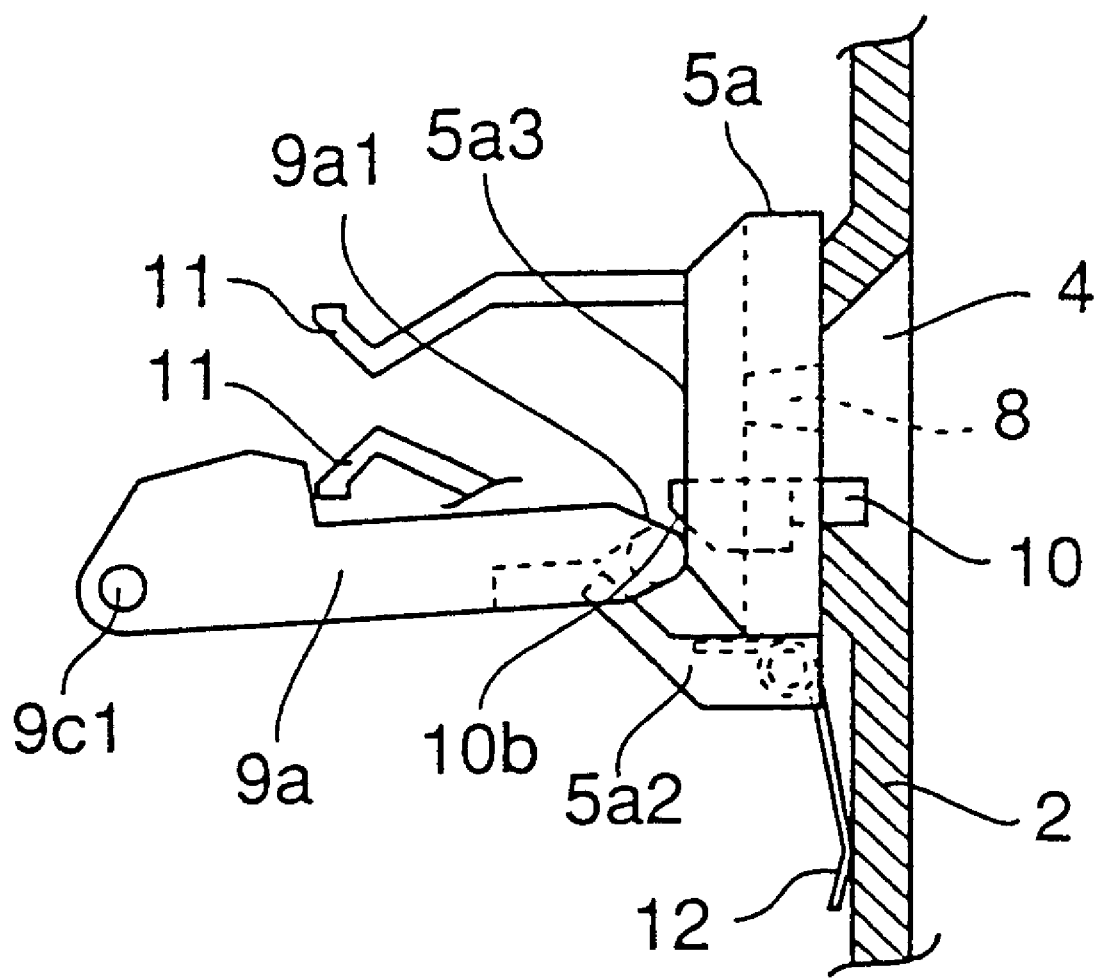
FIG. 12 is a side view when viewed from a vertical surface including the line B—B in FIG. 5.
Figure 14:
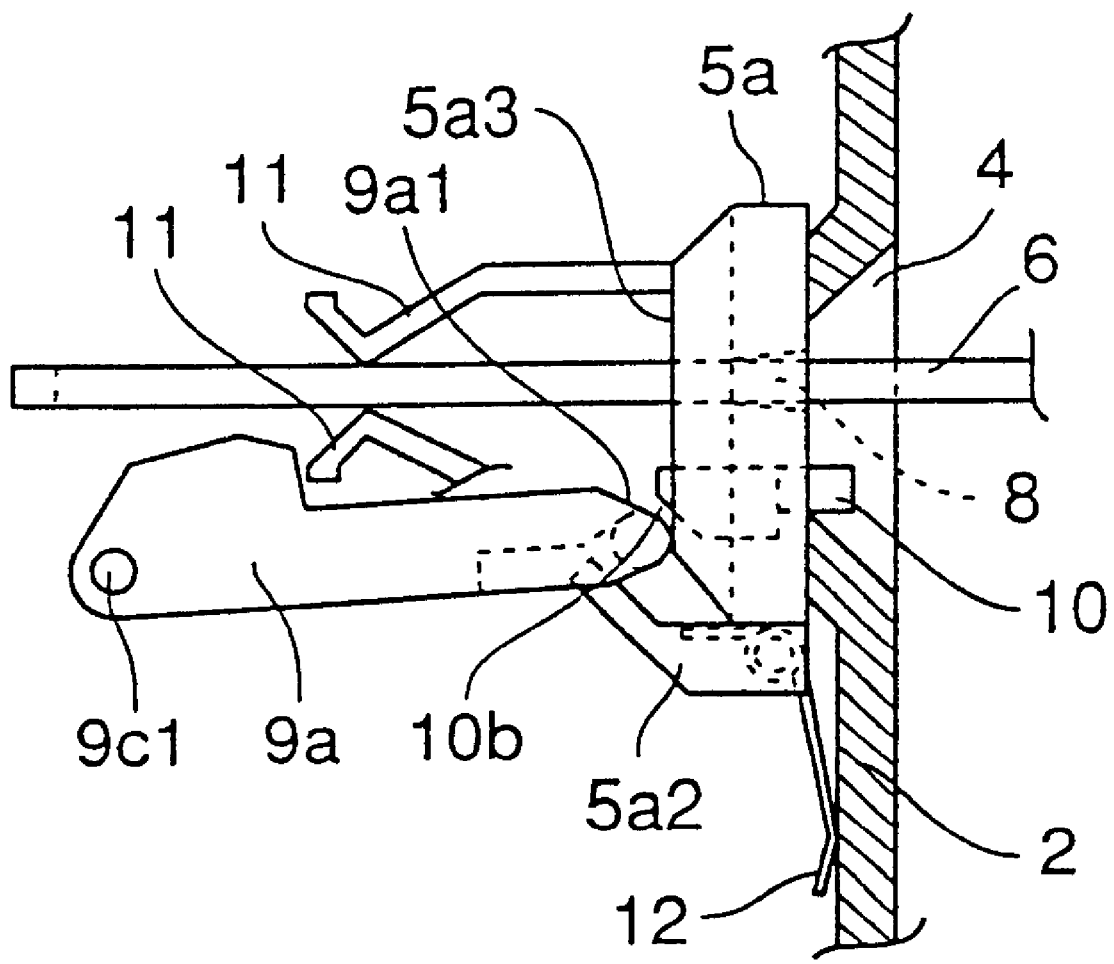
FIG. 14 is a side view when viewed from the vertical surface including the line B—B in FIG. 5 when a bare disk is received therein.

FIG. 12 and FIG. 14 shows a sequence of disk loading.

As shown in FIG. 12, when a disk is not inserted in the player, the cover member 5a blocks the slot 4. Even if an operator pushes a part of the cover member 5a, the cover 5 does not open because the edge sections of the inclined sections 9a1, 9a1' of the lock arm members 9, 9' located in both sides thereof contact the open/close stopper surfaces 5a3, 5a3' of the cover member 5a.

Figure 13:
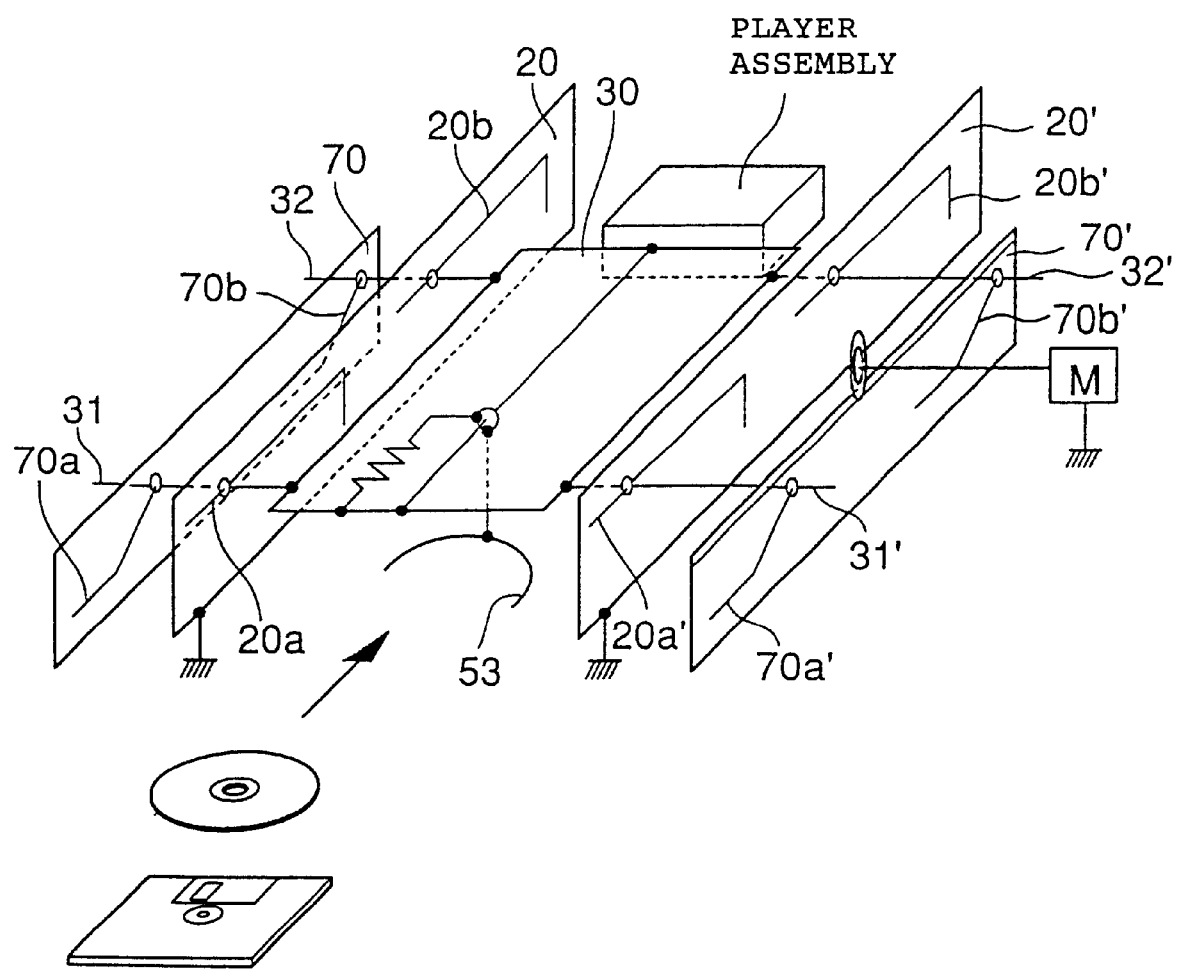
FIG. 13 is a conceptual view of the carrier mechanism in FIG. 6.

As shown in FIG. 13, in the state before the disk 6 is inserted in, the carrier pins 31, 32, 31', 32' positioned in the carrier member 30 are located each slightly rearward from each front edge of the reverse-L-shaped cam holes 20a, 20b, 20a', 20b' of the fixed chassis 20, 20', and located at each rear edge of the inclined cam holes 70a, 70b, 70a', 70b' of the rack members 70, 70'.

As shown in FIG. 14, when the disk 6 is inserted into the slit 8 provided on the cover member 5a, the disk 6 is held by the horizontal-level holding member 11 provided in the rear side of the slit 8, and kept in the horizontal level. Therefore, when the operator further pushes the disk 6 thereinto, the disk 6 surely meets the groove of the guide ring 53 with the disk horizontally kept.

Figure 15:
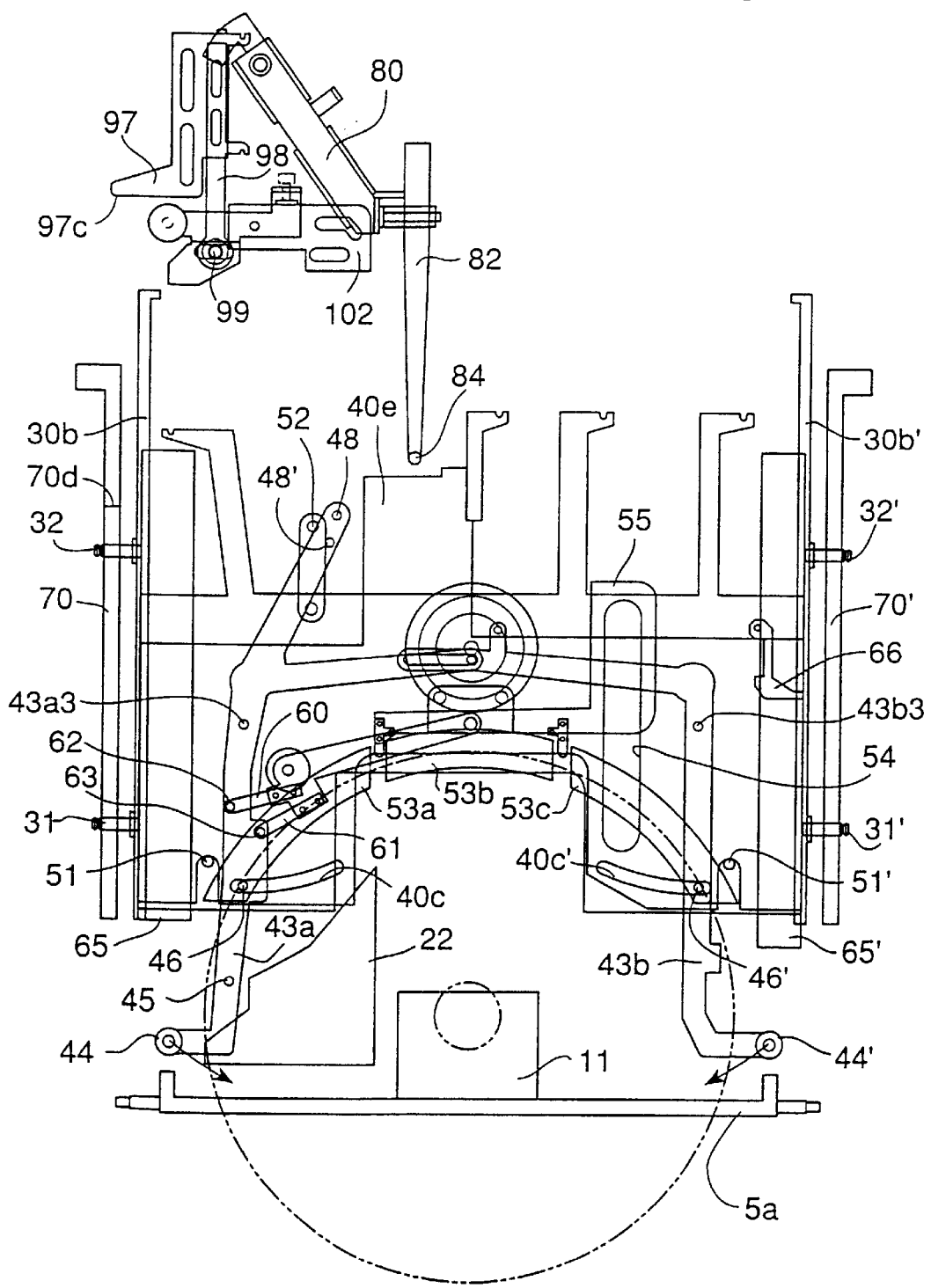
FIG. 15 is a plan view of the key section along the horizontal surface including the line A—A in FIG. 2 when the bare disk is received therein.

As shown in FIG. 15, when the disk 6 is further pushed thereinto, the guide ring 53 is pushed into the rear side, which makes the centering plate 50 move rearward. The pin 51' positioned in the front of the centering plate 50 moves the edge 41c of the lock plate 41 rearward while engaged with the edge 41c. Accordingly, the lock plate 41 pivots around the pivot 41a, and the engagement of the hook-shaped edge 41b with the guide pin 46 on the hold arm 43 is released. Herein, since the spring 49 gives a force to make front sections of the hold arms 43a, 43b approach each other thereto, the hold arms 43a, 43b rotate in the opposite direction to each other around the pivot 43a3 and 43b3 while sliding the guide pins 46, 46' along the arc-shaped holes 40c, 40c' of the arm plate 40 respectively. Therefore, the disk guide tips 44, 44' provided at the front edge sections of the hold arms 43a, 43b meet the side section of the disk 6, and the side section of the disk 6 are put into the grooves of the large-diameter guide rings 53a, 53c of the guide ring 53. On the other hand, concurrently when the lock plate 41 pivots, a switch (not shown) engaged therewith is turned ON, the drive motor 1c engaged with the rack member 70' is actuated, and the carrier mechanism is actuated.

Figure 16:
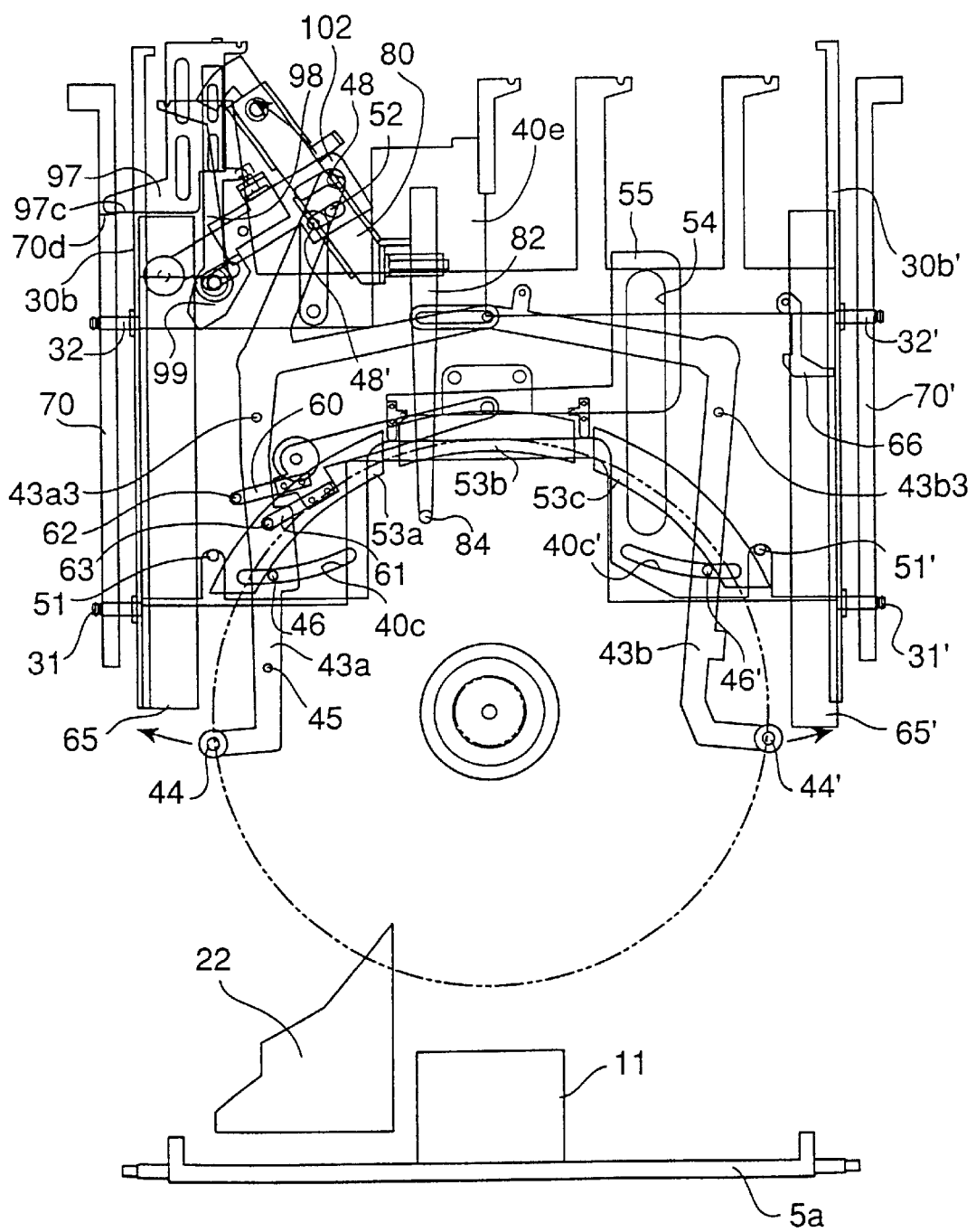
FIG. 16 is a plan view of the key section along the horizontal surface including the line A—A in FIG. 2 when the bare disk is centered on a turntable.

As shown in FIGS. 13 and 16, when the disk 6 is loaded, the lock plate 41 pivots, the switch (not shown therein) is turned ON, and the drive motor 1c runs as described above. Then, the rack members 70, 70' are moved rearward in synchronism with each other, the carrier pins 31, 32, 31', 32' go rearward while sliding along each horizontal section of the reverse-L-shaped cam holes 20a, 20b, 20a', 20b' without changing each relative position to the inclined cam holes 70a, 70b, 70a', 70b'. When the carrier pins 31, 32, 31', 32' reach each rear edge of the horizontal sections of the reverse-L-shaped cam holes 20a, 20b, 20a', 20b', the carrier pins 31, 32, 31', 32' go down along each vertical section of the reverse-L-shaped cam holes 20a, 20b, 20a', 20b' while sliding along each inclined section of the inclined cam holes 70a, 70b, 70a', 70b'. Accordingly, the carrier member 30 also moves down. The centering load pin 52 of the centering load arm 50b swingably provided in the centering plate 50 is slidably engaged in the slot 102a of the pull plate 102, and, on the other hand, the arm load pin 48 in the rear side of the hold arm 43 is also slidably engaged in the slot 102a of the pull plate 102. When the rack members 70, 70' are moved further rearward, the edge 70d of the rack member 70 meets the lever 97c of the drive plate 97 projecting outward passing through the window section 20c of the fixed chassis section 20 to move the lever 97c rearward. In synchronism with the movement, the drive plate 97 and the load plate 98 therewith energized by the spring also move rearward. Since the pin 99 pivots the road arm member 100 through the slot 100a, the pull plate 102 pivots rearward around the pin 101 as a pivot. Accordingly, both of the centering plate 50 and hold arm 43 are moved rearward by the pull plate 102, and the central position of the disk 6 reaches the central position of the turntable 1a. Herein, a damper 1b moves down from the upper side by the up-and-down mechanism not shown therein engaged with the rack members 70, 70', and the turntable 1a and the damper 1b hold the disk 6 from the upper and lower sides to achieve clamping.

In association with movement of the rack members 70, 70' further rearward, the pins 31, 32, 31', 32' reach each lower edge of the vertical sections of the reverse-L-shaped cam holes 20a, 20b, 20a', 20b' and stop thereat, and only the rack members 70, 70' move along each horizontal section of the inclined cam holes 70a, 70b, 70a', 70b' while sliding together with the pins 31, 32, 31', 32'. Therefore, the pull plate 102 pivots further rearward to move the arm plate 40 and the centering plate 50 further rearward. Accordingly, the disk 6 is disengaged from the disk guide tips 44, 44' as well as from the guide rings 53a, 53c. With those operations, playing will be effected.

For ejecting the disk 6 after playing is finished, the drive motor 1c is rotated backward according to an operation of an eject switch 1d by the operator, the rack members 70, 70' go frontward, the lever 97c of the drive plate 97 returns to the original position, and the pull plate 102 also returns to the original position. Therefore, the first and second arm members 43a, 43b forming the hold arm assembly 43 pivot so as to approach each other and hold the side section of the disk 6 with the disk guide tips 44, 44' again, and the centering plate 50 also returns to the original position, the large-guide rings 35a, 35c and the edge of the disk 6 are engaged with each other, and the disk is held.

Then, as clearly understood from FIG. 13, the pins 31, 32, 31', 32' move upward while sliding along each inclined section of the inclined cam holes 70a, 70b, 70a', 70b' as well as each vertical section of the reverse-L-shaped cam holes 20a, 20b, 20a', 20b', and the damper is released by the up-and-down mechanism not shown therein. Furthermore, when reaching each rear edge of the inclined cam holes 70a, 70b, 70a', 70b', the pins 31, 32, 31', 32' go frontward while sliding each horizontal section of the reverse-L-shaped cam holes 20a, 20b, 20a', 20b'. Then, the front edge of the disk 6 is inserted into the horizontal-level holding member 11, the arm reset pin 45 of the hold arm assembly 43 is inserted into the groove 22a of the arm reset plate 22 fixed to the bottom surface of the front bridge plate 21 to be moved to the left side along the groove, so that the hold arm assembly 43 releases the disk. With this operation, the guide pin 46' of the second arm member 43b is engaged in the lock plate 41 and the second arm member 43b is locked. On the other hand, since the left side of the first arm member 43a is engaged with the projection 62 on the cam lock plate 60 fixed to the pull arm plate 58, the pull arm plate 58 pivots in the clockwise direction viewed from the upper side around the pivot 58a. Then, since the pin 59 at the edge of the pull arm plate 58 is engaged in the slot 56a of the arm guide plate 56, the arm guide plate 56 and the disk push plate 55 fixed thereto are pushed frontward from the storage position between the centering plate 50 and the guide ring 53b. The pair of disk guide flanges 55a, 55a' fixed to the disk push plate 55 meet the edge of the disk 6 to push the disk frontward, and the edge of the disk 6 is exposed to frontward of the front panel 2 through the slit 8. Furthermore, when the rack members 70, 70' go frontward, the arm reset pin 45 meets the front edge of the groove 22a of the arm reset plate 22, and forward movement of the arm assembly 43 is stopped. When the rack members 70 and 70' go further frontward, the projection 62 of the cam lock plate 60 as a plate spring is disconnected from the edge of the first arm member 43a, so that the projection 62 and the first arm member 43a are disengaged from each other. The pull arm plate 58, disk push plate 55, and arm guide plate 56 return to each original position at the same time by means of restoring force of the spring 57. A switch (not shown) engaged with the rack members 70' is turned ON at the position, the drive motor 1c is rotated backward to return the rack members 70, 70' to the position where the disk 6 is loaded, and the switch is turned OFF, through which the operation is complete.

Figure 17:
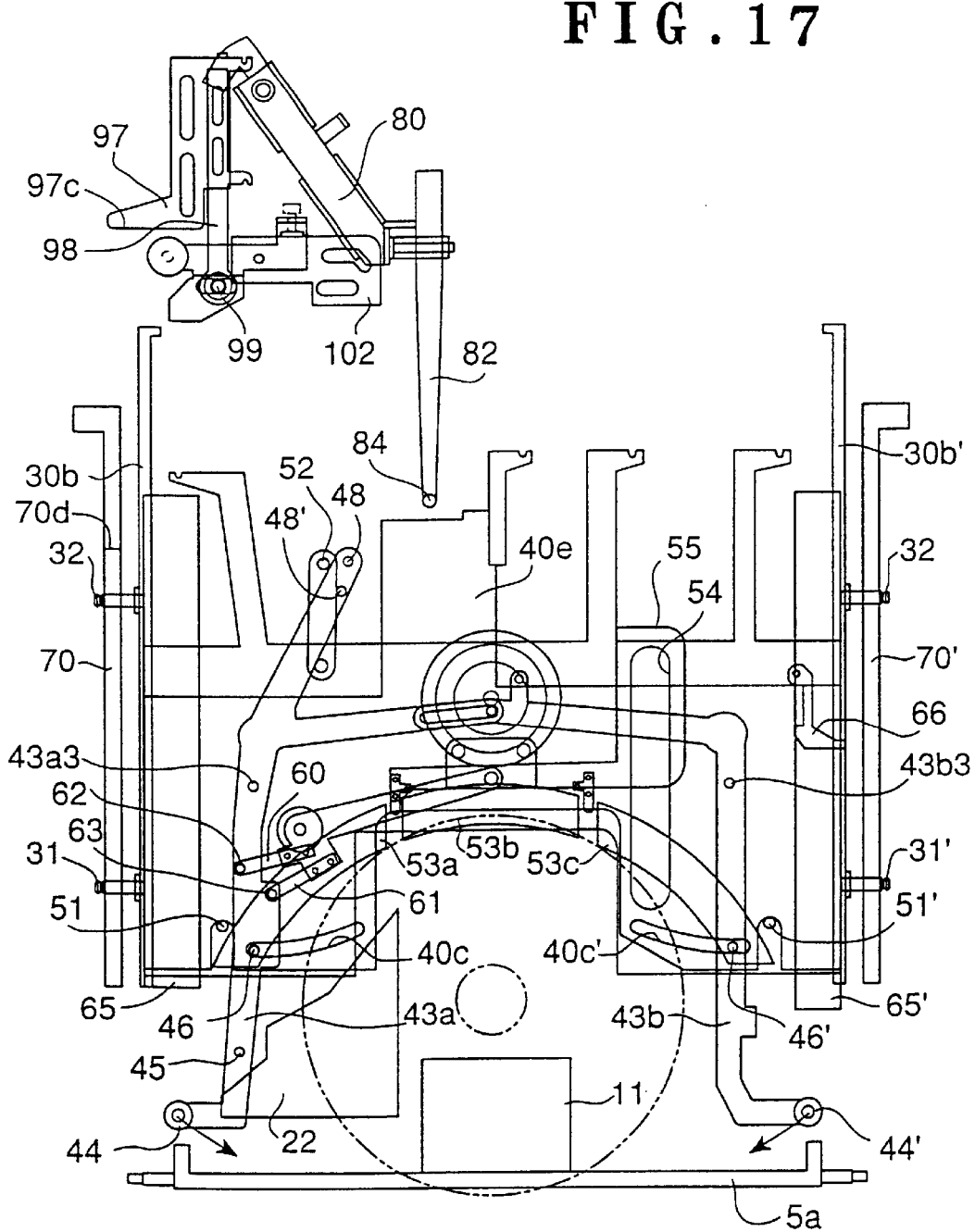
FIG. 17 is a plan view of the key section along the horizontal surface including the line A—A in FIG. 2 when the bare disk is received therein.
Figure 18:
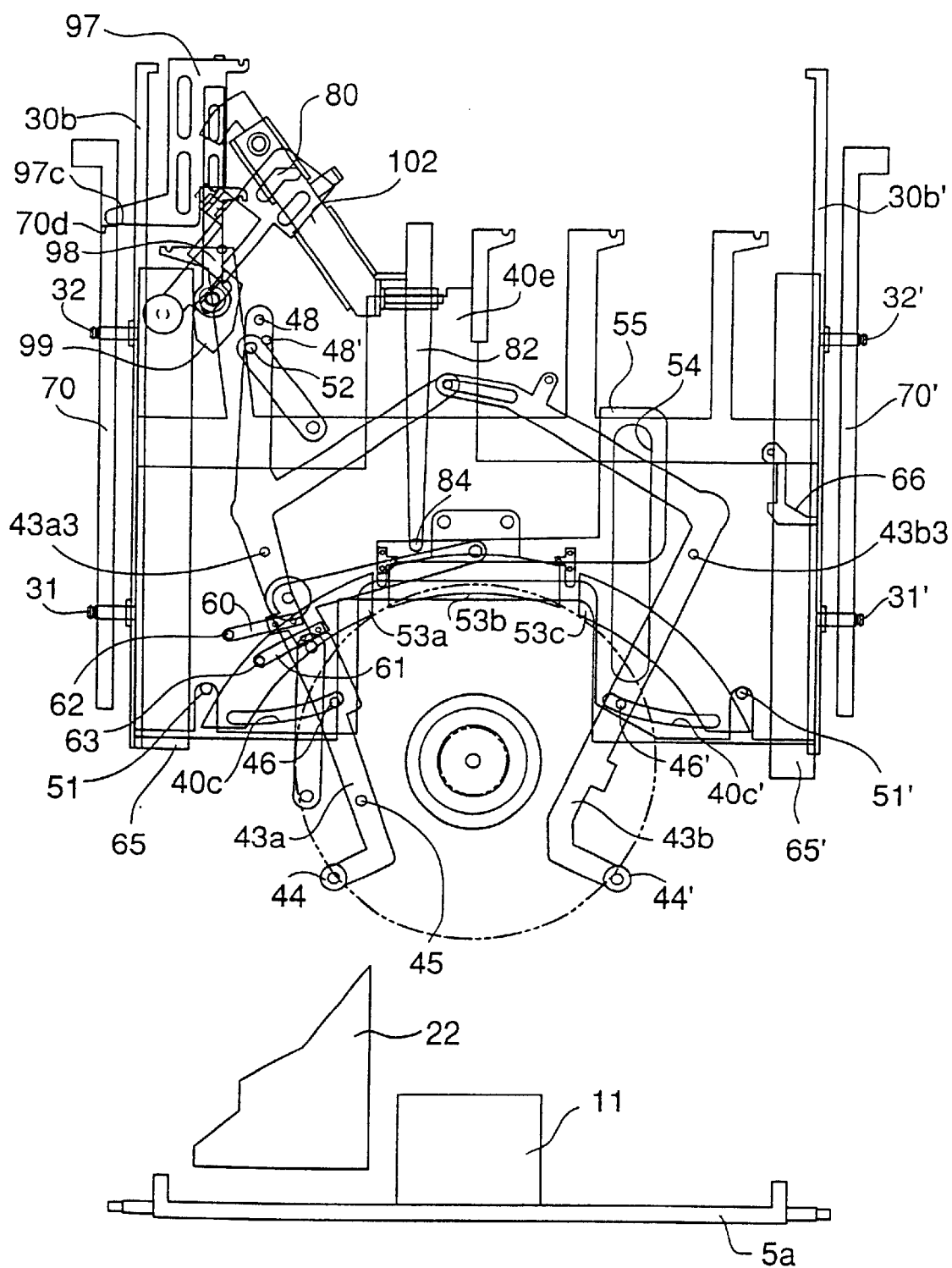
FIG. 18 is a plan view of the key section along the horizontal surface including the line A—A in FIG. 2 when the bare disk is centered on a turntable.
Figure 19:
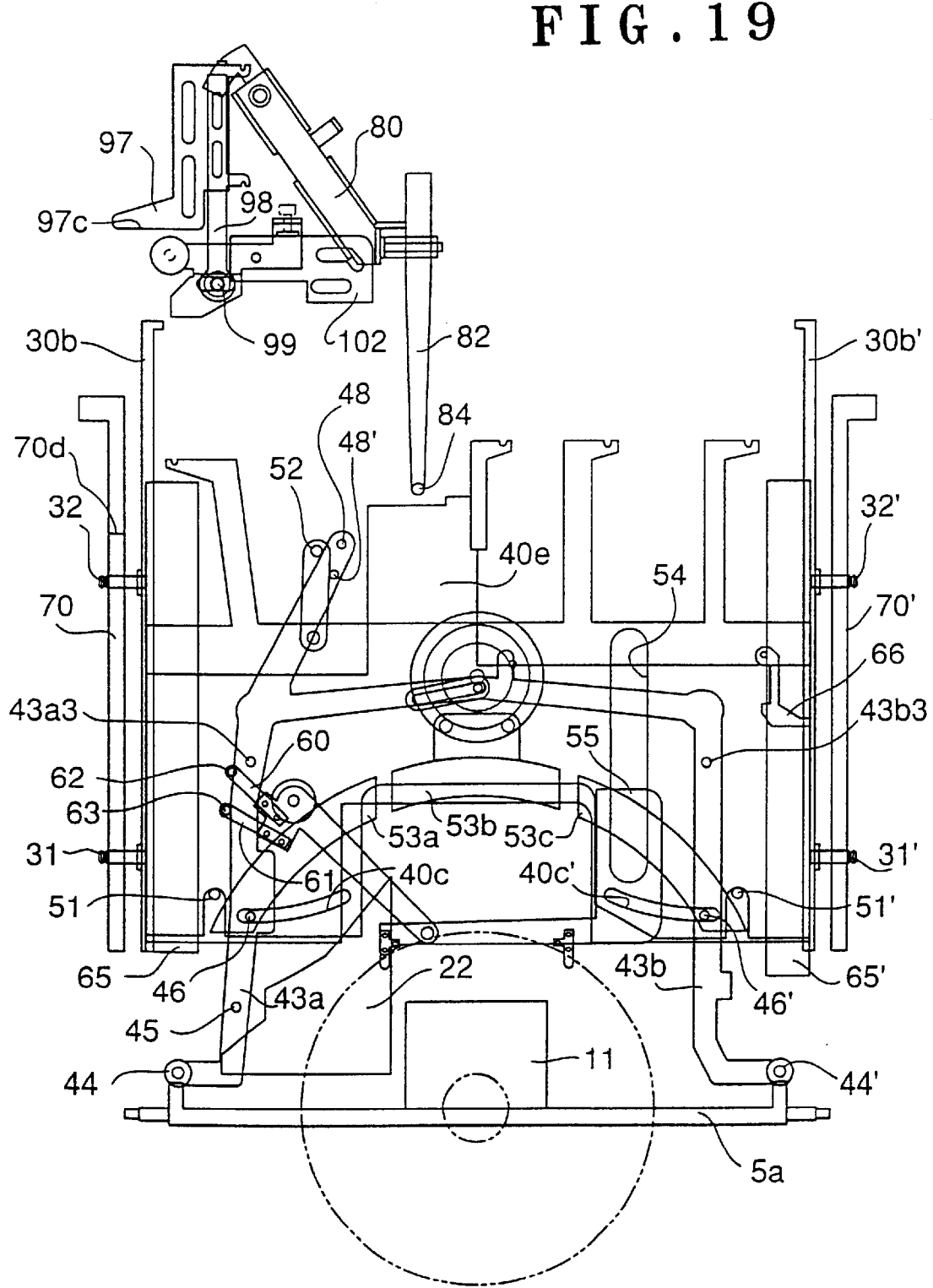
FIG. 19 is a plan view of the key section along the horizontal surface including the line A—A in FIG. 2 when the bare disk is ejected therefrom.
Figure 20:
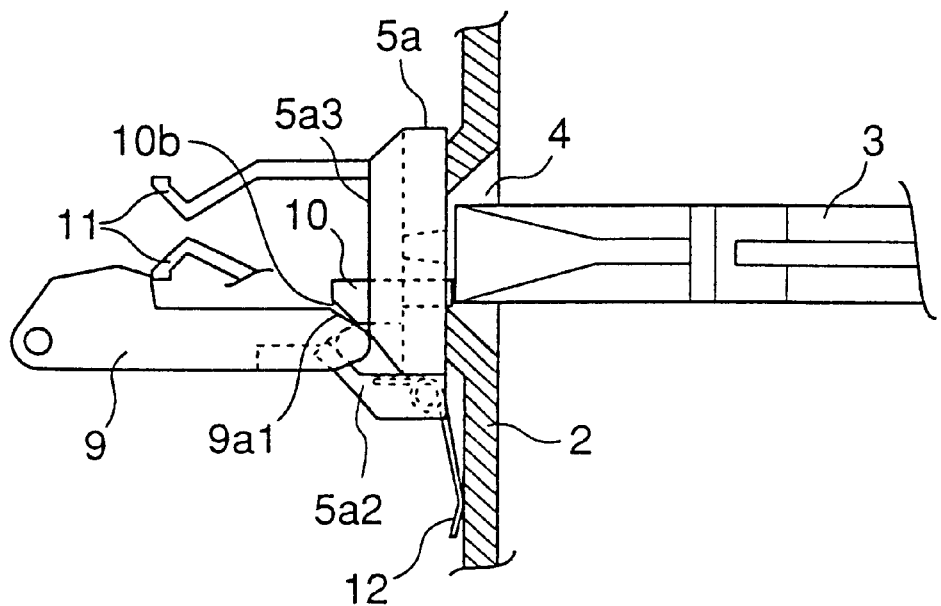
FIG. 20 is a side view when viewed f rom the vertical surface including the line B—B in FIG. 5 when a cartridge disk contacts the cover.
Figure 21:
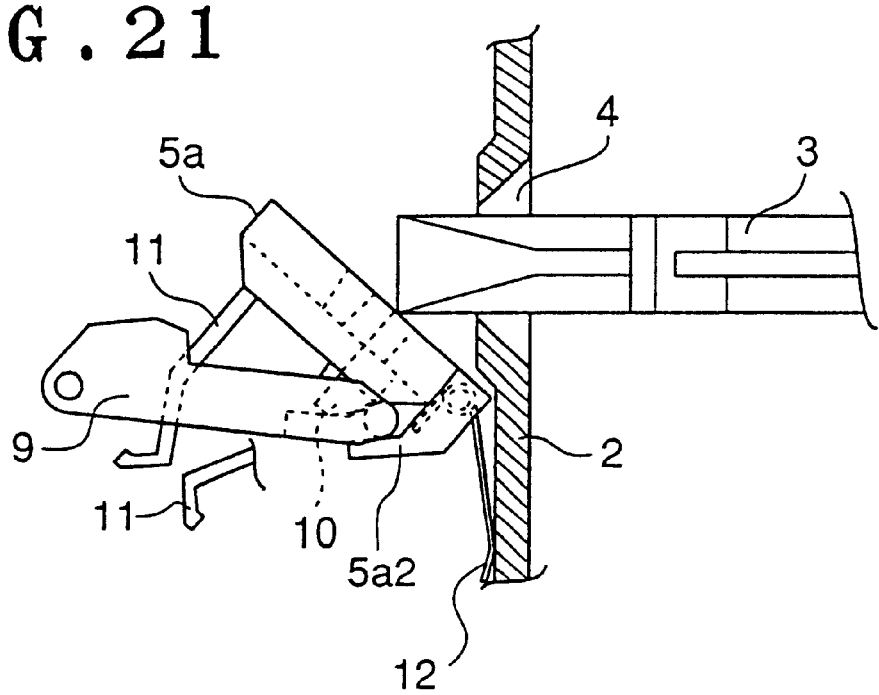
FIG. 21 is a side view when viewed from the vertical surface including the line B—B in FIG. 5 when the cartridge disk is received therein.
Figure 22:
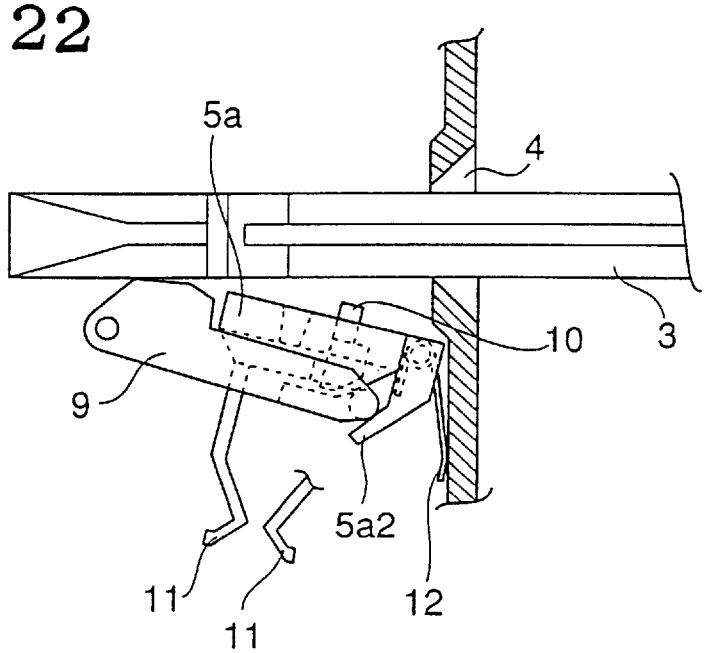
FIG. 22 is a side view when viewed from the vertical surface including the line B—B in FIG. 5 when the cartridge disk is received further received therein than the state shown in FIG. 21.

Next, detailed description is made for disk loading when a disk to be played is a bare disk 7 with a diameter of 8 cm. FIG. 17, FIG. 18, and FIG. 19 show the loading sequence.

As shown in FIG. 17, when the bare disk 7 is inserted into the slit 8 provided in the cover 5 by the operator, similar to the case of loading of the 12 cm-diameter disk 6, the disk 7 meets the groove of the disk guide ring 53 through the horizontal-level holding member 11. When the operator further pushes the disk thereinto, the centering plate 50 is moved rearward through the disk guide ring 53, the hold arm assembly 43 is unlocked, and the first and second arm members 43a, 43b pivot around the rotation axes 43a3, 43b3 in the opposite direction to each other. The disk guide tips 44, 44' provided at the front edge sections of the first and second arm members 43a, 43b meet the side and front section of the disk 7. Furthermore, the disk 7 is held with the side section thereof put into the small-diameter guide ring 53b located in the rear side while sliding the side section of the disk 7 along the groove of the large-diameter guide ring 53a or 53c.

Similar to the case of the disk 6, the carrier mechanism starts to run at the instant when the switch not shown is turned ON in response to pivoting of the lock plate 41, and moves down along each vertical section of the reverse-L-shaped cam holes 20a, 20b, 20a', 20b' while sliding along each inclined section of the inclined cam holes 70a, 70b, 70a', 70b', and the carrier member 30 also moves down.

However, as shown in FIG. 18, since the diameter of the disk 7 is smaller than that of the disk 6, the distance between the front edge section of the hold arm assembly 43 is narrow, therefore the branched arm section 43a of the first arm member 43a is positioned in the left side than the case of the disk 6, and further the arm load pin 48' contacts the centering load arm 50b provided under the pin from the right side to move the centering load arm 50b in the counterclockwise direction viewed from the upper side around the pivot 50a. Because of this, the centering load pin 52 and the arm load pin 48 do not engage the pull plate 102. Namely, the centering plate 50 and the arm plate 40 are not pulled rearward by movement of the rack members 70, 70', but the disk 6 is centered on the turntable 1a with the plates kept as they are, and then the disk 7 is held by the damper 1b and the turntable 1a from the upper and lower sides. With those operations, playing will be effected.

For ejecting the disk 7 after playing is finished, the drive motor 1c is rotated backward according to an operation of an eject switch 2c by the operator, the rack members 70, 70' go frontward. The pins 31, 32, 31', 32' move upward while sliding along each inclined section of the inclined cam holes 70a, 70b, 70a', 70b' as well as each vertical section of the reverse-L-shaped cam holes 20a, 20b, 20a', 20b', and the damper is released. Furthermore, the pins 31, 32, 31', 32' meet each rear edge of the inclined cam holes 70a, 70b, 70a', 70b', and go frontward while sliding each horizontal section of the reverse-L-shaped cam holes 20a, 20b, 20a', 20b'. The arm reset pin 45 of the hold arm assembly 43 is inserted into the groove 22a of the arm reset plate 22 fixed to the bottom surface of the front bridge plate 21, and the arm reset pin 45 moves to the left side along the groove, then the hold arm assembly 43 releases the holding of the disk. With this operation, the guide pin 46' of the second arm member 43b is engaged in the lock plate 41 and the second arm member 43b is locked.

As shown in FIG. 19, since the disk 7 has the diameter smaller than that of the disk 6, the left side of the first arm member 43a is engaged with the projection 63 on the cam lock plate 61 fixed to the pull arm plate 58. Therefore, when the pull arm plate 58 pivots in the clockwise direction viewed from the upper side around the pivot 58a, as the pin 59 at the edge of the pull arm plate 58 is engaged in the slot 56a of the arm guide plate 56, the arm guide plate 56 and the disk push plate 55 fixed thereto are pushed further frontward from the storage position between the centering plate 50 and the guide ring 53b than the case of the disk 6. The pair of disk guide flanges 55a, 55a' fixed to the disk push plate 55 meet the edge of the disk 7 to push the disk frontward, and the edge of the disk 7 is exposed to frontward of the front panel 2 through the slit 8 by the same length as that of the disk 6.

Furthermore, when the rack members 70, 70' go frontward, the arm reset pin 45 meets the front edge of the groove 22a of the arm reset plate 22, and movement of the hold arm assembly 43 is stopped. When the rack members 70 and 70' go further frontward, the projection 63 of the cam lock plate 61 as a plate spring is disconnected from the edge of the first arm member 43a, so that the projection 63 and the first arm member 43a are disengaged from each other, and the pull arm plate 58, disk push plate 55, and arm guide plate 56 return to each original position at the same time by means of restoring force of the spring 57. A switch not shown engaged with the rack members 70' is turned ON at the position, the drive motor 1c is rotated backward to return the rack members 70, 70' to the position where the disk 6 is loaded, and the switch is turned OFF, through which the operation is complete.

Figure 25:
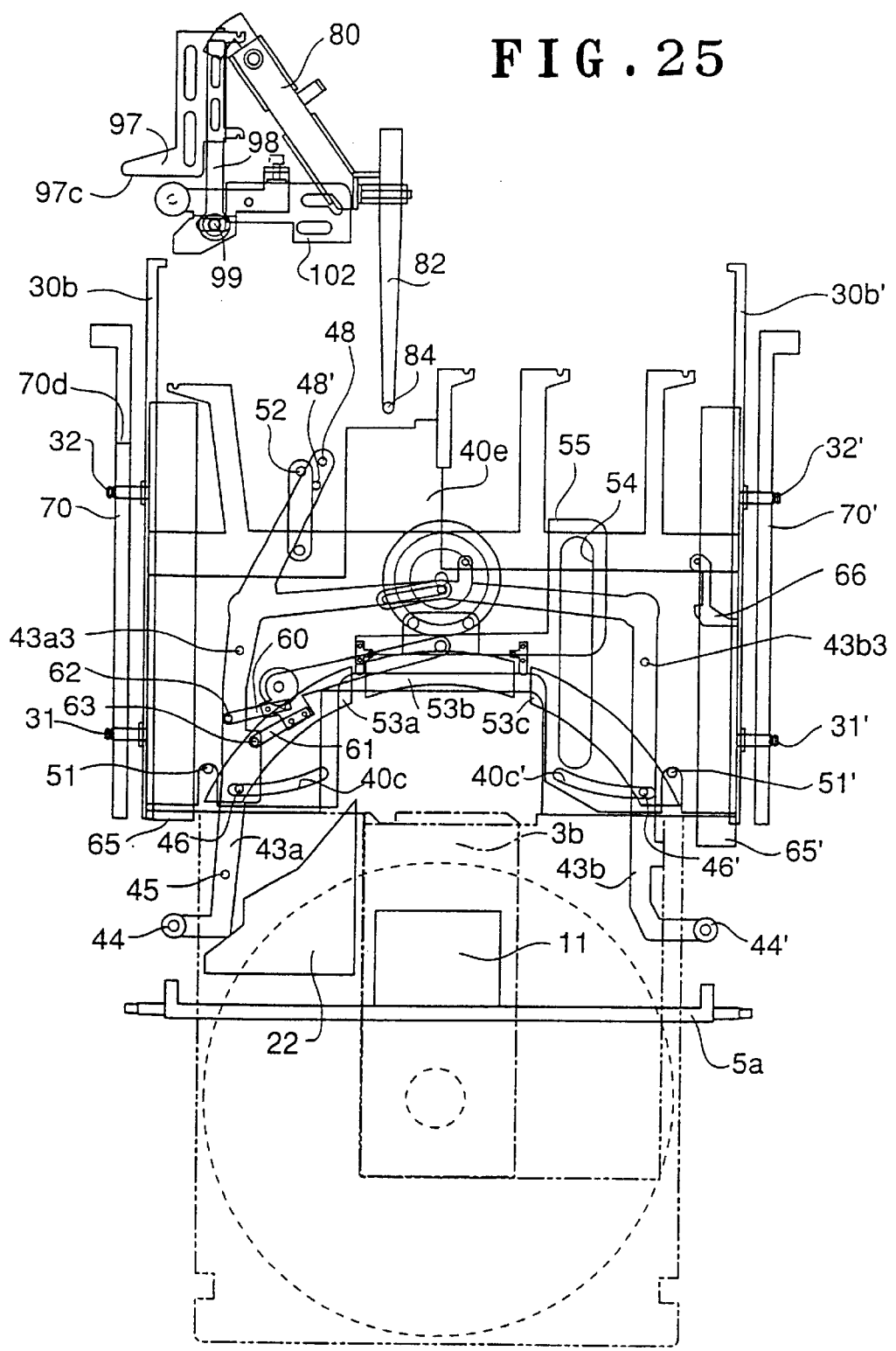
FIG. 25 is a plan view of the key section along the horizontal surface including the line A—A in FIG. 2 when the cartridge disk is received therein.
Figure 26:
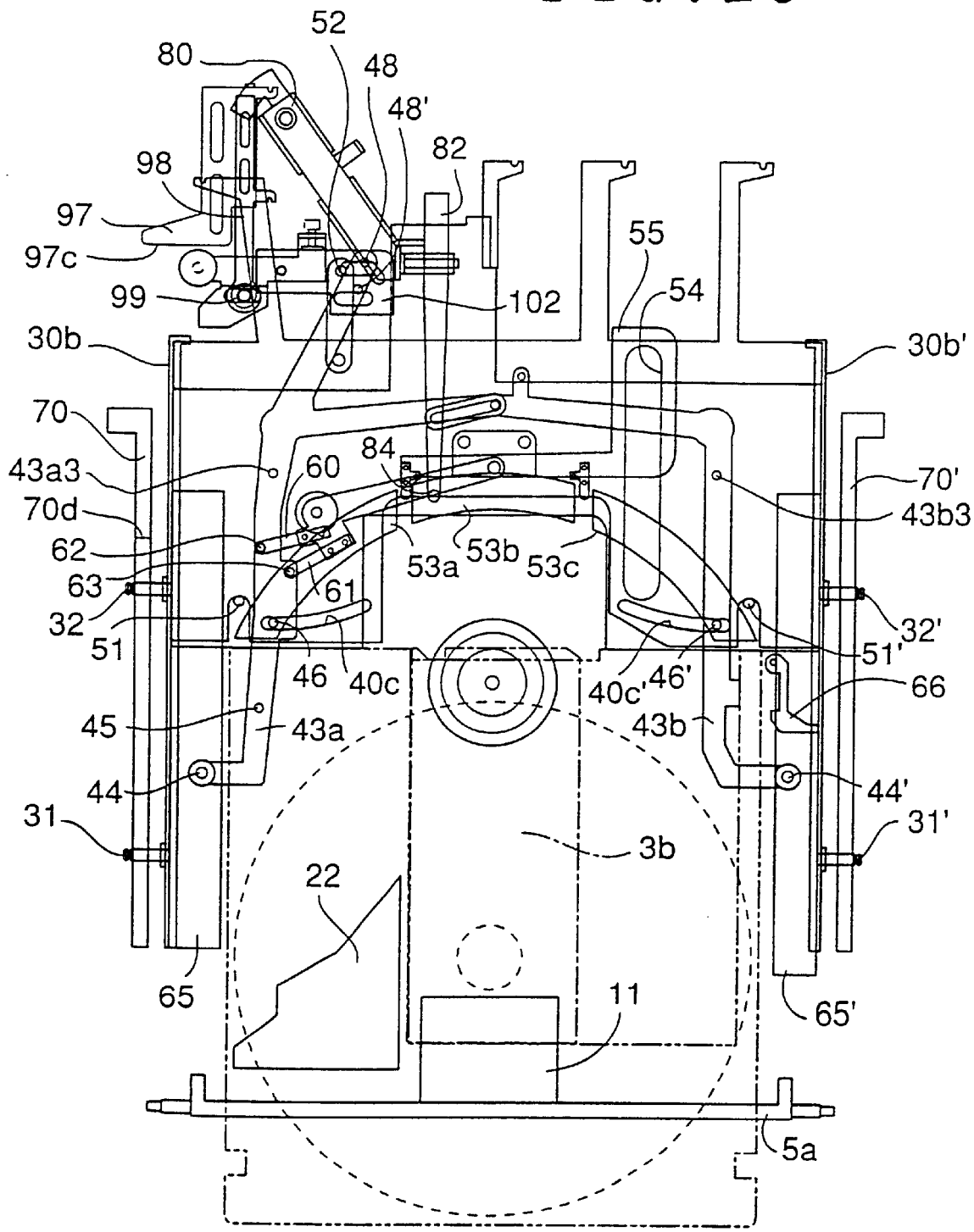
FIG. 26 is a plan view of the key section along the horizontal surface including the line A—A in FIG. 2 when the cartridge disk is held by a guide assembly.
Figure 27:
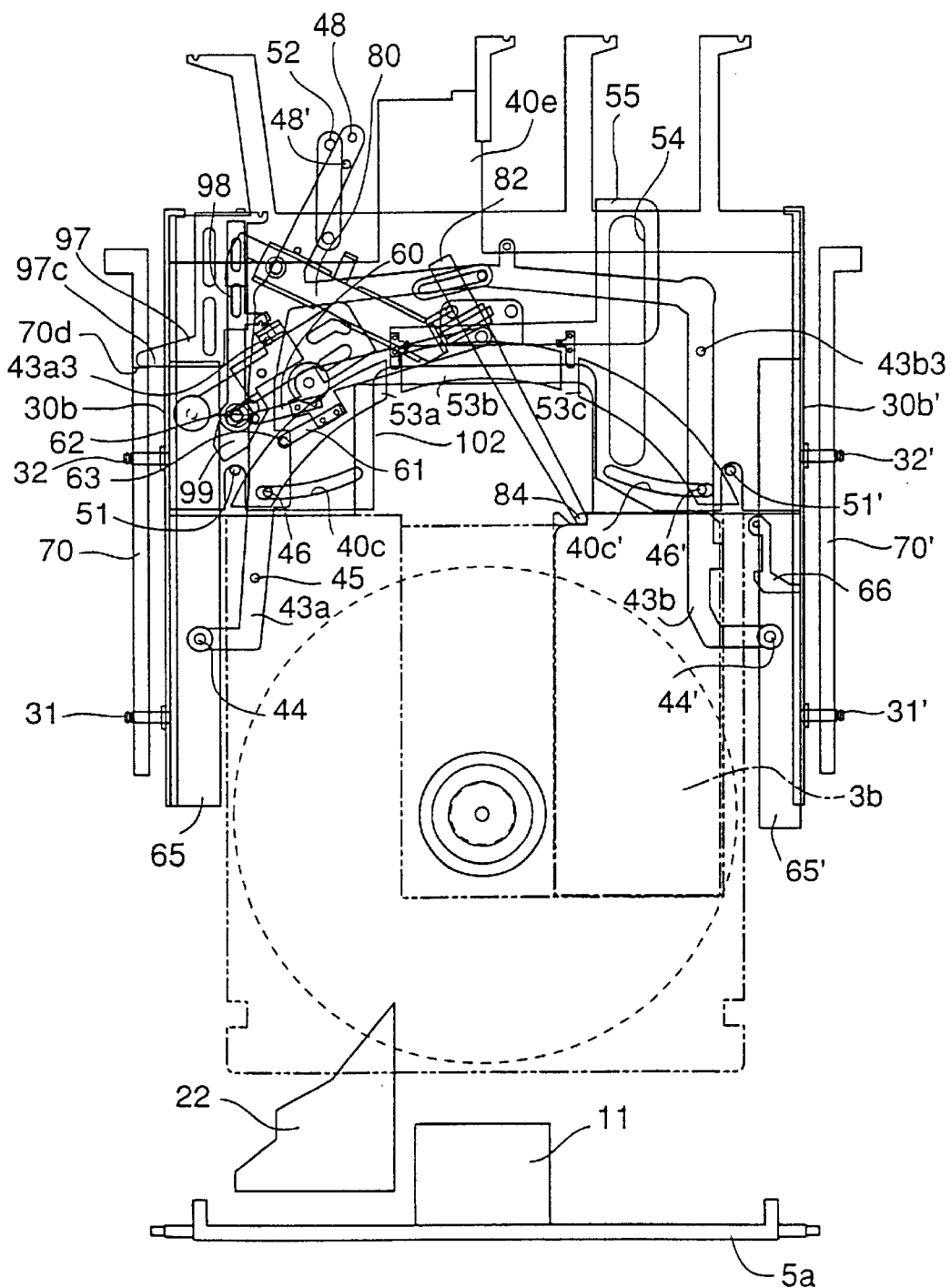
FIG. 27 is a plan view of the key section along the horizontal surface including the line A—A in FIG. 2 when the cartridge disk is centered on the turntable.

Next, detailed description is provided for disk loading when a disk to be played is a cartridge disk 3. FIG. 25 through FIG. 27 show the loading sequence.

As shown in FIG. 20 through FIG. 22 and FIG. 25, when the cartridge disk 3 contacts the slot 4 of the front panel 2, both edges of the cartridge disk 3 contact two unlocking rivets 10 of the cover 5 projected frontward and pushes the rivets. When the unlocking rivets 10 are pushed rearward, the inclined section 9a1 of the lock arm 9a contacting the bottom section 10b of the rear projecting section 10a in the rear side of the unlocking rivet 10 is moved downward while sliding along the bottom section 10b. Therefore, the edge section of the inclined section 9a1 moves to the lower section of the open/close stopper surface 5a3 of the cover member 5a, and the cover can be opened or closed. The lock arm member 9' located in the right side has the same configuration as described above.

The cover member 5a is pushed further rearward by the cartridge disk 3 to pivot rearward. The horizontal-level holding member 11 fixed to the cover member 5a also moves from an access path for the cartridge disk 3 together with the cover member 5a to avoid interference with the cartridge disk 3.

The cartridge disk 3 pushed further rearward is engaged with the cartridge guide grooves 65b, 65b' of the cartridge guide members 65, 65' in the rear side of the slot 4 through the slot 4. The rear edge of the cartridge disk 3 meets the rear edge of the guide ring 53 and the cartridge pushes a lock member not shown, then, the lock of the centering plate 50 is unlocked and the guide ring 53 is pushed rearward. The centering plate 50 integral with the guide ring 53 also moves rearward while sliding along the second slits 33b, 33b' of the plate guides 33, 33'. Then the rear edge of the cartridge disk 3 meets the tongue section 40f of the arm plate 40, and the arm plate 40 also moves rearward.

As shown in FIG. 26, when the cartridge disk 3 is further pushed, the centering plate 50 moves further rearward while sliding along the second slits 33b, 33b' through the guide ring 53. At the same time, the disk guide tips 44, 44' at the front sections of the hold arm 43 go into the escape grooves 65a, 65a' from the opening in the front side of the disk guide members 65, 65', and move rearward.

When the cartridge disk 3 is further pushed, the cartridge disk 3 is locked by engaging the edge 66b of the cartridge lock 66 projecting toward the cartridge guide grooves 65b' with the concave sections 3a' provided on the side of the cartridge disk 3. The cartridge disk 3 is held by the cartridge guide members 65, 65'. Furthermore, the switch 68 engaged in the cartridge lock 66 is turned ON, and the carrier mechanism runs.

As shown in FIG. 27, the cartridge disk 3 fixed to the carrier member 30 through the cartridge guide members 65, 65' is carried in its horizontal level by the above mentioned carrier mechanism. The arm plate 40 is pushed by the cartridge disk 3 and positioned in the rear side of the carrier member 30, therefore, in association with the movement of the carrier member 30, the tongue section 40e in the rear side of the arm plate 40 meets the up-and-down lever 85 at the rear edge section of the shutter open/close arm 82, and the up-and-down lever 85 slides onto the tongue section 40e. Then, the up-and-down lever 85 moves upward, while the open/close lever 84 at the front edge section of the arm 82 moves downward. During this process, the cutout 30a1 formed on the top section 30a of the carrier member 30 is positioned in the front side, while the cutout 40d of the arm plate 40 and the cutout 50d of the centering plate 50 are positioned in the rear side, and the open/close lever 84 moves downward through the space therebetween and engaged in the concave section at the front section of the shutter 3b of the cartridge disk 3. When the cartridge disk 3 moves further rearward, the open/close arm 82 pivots together with the shutter 3b in the counterclockwise direction viewed from the upper side around the pivot 80a1 of the arm supporting member 80 to open the shutter.

Although the carrier member 30 moves down after the lever 84, the open/close arm 82 is also rotatable around the pivot 82*a*, thus engagement thereof with the shutter being maintained. The cartridge disk 3 is centered on the turntable 1*a*, and the damper 1*b* moves down by the up-and-down mechanism not shown, thus a playing state being complete. At this point of time, the large-diameter disk guide ring 53*a* fixed to the centering plate 50 contacts the escape guide 94 from the upper side, moves the guide downward, and pivots the escape or moveable plate 90 downward around the pivot 90*a* through the release bracket 95 integrally provided with the escape guide 94. Accordingly, it is possible to prevent interference of parts on the centering plate 50 with parts on the escape or moveable plate 90.

Figure 23:
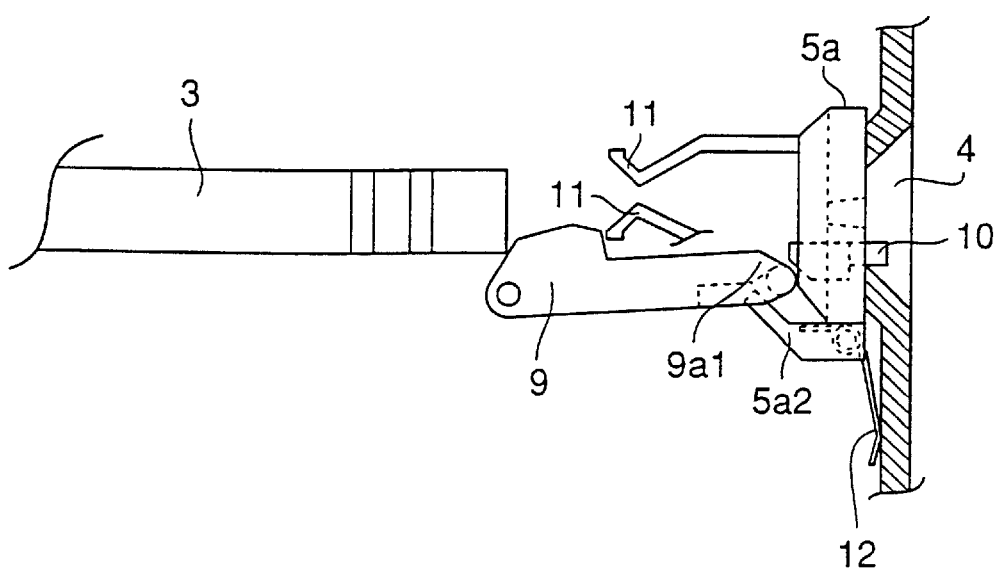
FIG. 23 is a side view when viewed from the vertical surface including the line B—B in FIG. 5 when the cartridge disk contacts the lock arm assembly for ejection.
Figure 24:
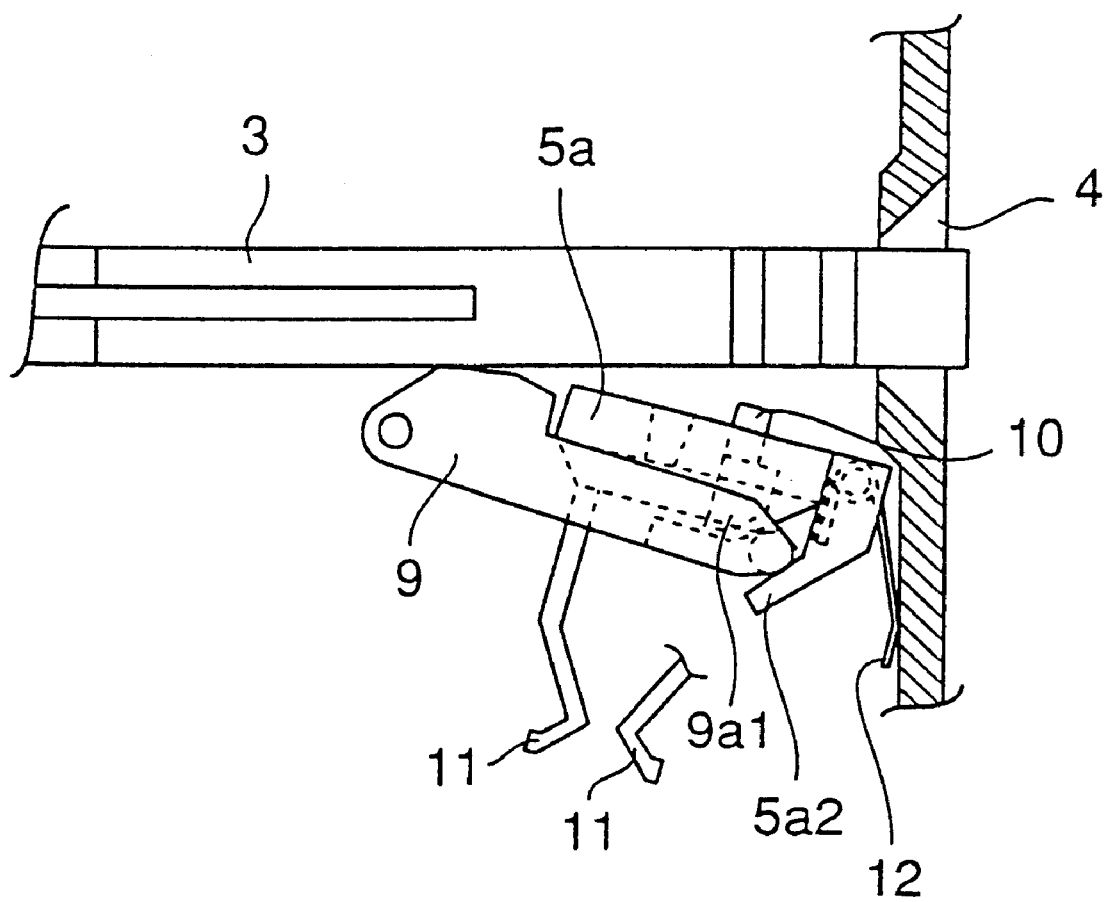
FIG. 24 is a side view when viewed from the vertical surface including the line B—B in FIG. 5 when the edge of the cartridge disk projects from the slot for ejection.

As shown in FIG. 23 and FIG. 24, after playing or recording is finished, the drive motor 1*c* is rotated backward according to an operation of the eject switch 1*d* by the operator, and the rack members 70, 70' go frontward. The cartridge disk 3 together with the cartridge guide members 65, 65' is carried automatically along the original path from the location of playing or of the recording unit. When the cartridge disk 3 is about to pass over the lock arm member 9, the front edge of the cartridge disk 3 contacts the sliding inclined surface 9*d* of the lock arm member 9, and rotates the lock arm member 9 in the clockwise direction when viewed to the X direction around the rotary shafts 9*c*1. Accordingly, the concave section 9*a*2 in the lower side of the lock arm 9*a* moves the open/close arm 5*a*2 of the cover member 5*a* downward, and the cover 5 pivots rearward around the rotary shaft 5*a*1 and releases the slot 4.

When the cartridge disk 3 is loaded, the switch not shown is turned ON at the position where the cartridge disk 3 is held to the cartridge guide members 65, 65' by the cartridge lock 66 to stop the drive motor lc, and the rack members 70, 70' stop. When the cartridge lock 66 is disengaged from the cartridge disk 3, the centering plate 50 moves frontward while sliding along the second slits 33*b*, 33*b*' of the plate guides 33, 33' by means of the restoring force of the spring 35. The guide ring 53 fixed to the centering plate 50 moves the cartridge disk 3 frontward keeping in contact with the cartridge disk 3. As a part of the cartridge disk 3 is projected from the slot 4, the operator can pull out the disk therefrom.

As described above, with the slot-in type of front-loading disk player according to the present invention, even when either a bare disk or a cartridge disk is inserted through a front panel, the disk can be held, pulled into the internal section thereof, automatically carried to a playing unit, and played.

What is claimed is:

1. A front-loading disk player comprising:
   a player assembly for playing a disk having been carried thereto;
   a front panel positioned in front of said player assembly and having a slot for receiving therein either one of a bare disk and a cartridge disk holding a recording disk therein;
   a first carrier unit for carrying only the bare disk having passed through said slot to said player assembly; and
   a second carrier unit for carrying only the cartridge disk having passed through said slot to said player assembly,
   wherein the first carrier unit is movable along the same carrier path on which the cartridge disk is carried by the second carrier unit.

2. The front-loading disk player according to claim 1 further comprising:
   a cover section for blocking said slot.

3. The front-loading disk player according to claim 2; wherein a second slot for receiving only the bare disk therein is provided in said cover section.

4. The front-loading disk player according to claim 3; wherein said cover section has a guide member for guiding the bare disk, the guide member being provided integrally therewith in a rear side thereof in a direction to which a disk is inserted therein.

5. The front-loading disk player according to claim 3; wherein a lock unit for locking an operation of opening said slot is provided on said cover section.

6. The front-loading disk player according to claim 5; wherein said cover section has a guide member for guiding the bare disk, the guide member being provided integrally therewith in a rear side thereof in a direction to which a disk is inserted therein.

7. The front-loading disk player according to claim 5; wherein said lock unit is provided in edge sections of said cover section.

8. The front-loading disk player according to claim 7; wherein said cover section has a guide member for guiding the bare disk, the guide member being provided integrally therewith in a rear side thereof in a direction to which a disk is inserted therein.

9. The front-loading disk player according to claim 1; wherein the first carrier unit moves by being pushed by the cartridge disk carried by the second carrier unit.

10. The front-loading disk player according to claim 9 further comprising:
    a cover section for blocking said slot.

11. The front-loading disk player according to claim 10; wherein a second slot for receiving only the bare disk therein is provided in said cover section.

12. The front-loading disk player according to claim 11; wherein said cover section has a guide member for guiding the bare disk, the guide member being provided integrally therewith in a rear side thereof in a direction to which a disk is inserted therein.

13. The front-loading disk player according to claim 11; wherein a lock unit for locking an operation of opening said slot is provided on said cover section.

14. The front-loading disk player according to claim 13; wherein said cover section has a guide member for guiding the bare disk, the guide member being provided integrally therewith in a rear side thereof in a direction to which a disk is inserted therein.

15. The front-loading disk player according to claim 13; wherein said lock unit is provided in edge sections of said cover section.

16. The front-loading disk player according to claim 15; wherein said cover section has a guide member for guiding the bare disk, the guide member being provided integrally therewith in a rear side thereof in a direction to which a disk is inserted therein.

17. A front-loading disk player comprising:
    a player assembly for playing a disk having been carried thereto;
    a front panel positioned in front of said player assembly and having a slot for receiving either one of a bare disk and a cartridge disk holding a recording disk therein; and
    a carrier unit for carrying only one of the bare disk and the cartridge disk having passed through said slot to said player assembly, wherein said carrier unit can move along the carrier path and includes a base unit movable along the carrier path, a bare disk support assembly mounted on said base unit for supporting the bare disk, and a pair of arms movably mounted on said base unit for abutting onto edges of said bare disk, but not said cartridge disk, so as to hold said bare disk in cooperation with said bare disk support assembly.

18. The front-loading disk player according to claim 17, wherein said base unit can move along the carrier path relative to said carrier unit.

19. The front-loading disk player according to claim 17, wherein said bare disk support assembly includes a first support member for receiving an edge portion of a small-diameter bare disk, and a second support member for receiving an edge portion of a large-diameter bare disk.

20. The front-loading disk player according to claim 17, wherein said pair of arms hold the bare disk at edge portions of the bare disk.

21. The front-loading disk player according to claim 17, wherein said carrier unit includes lock means for keeping said arms at an open state in which said arms are positioned to be free from said cartridge disk when said cartridge disk is inserted.

* * * * *